US010386964B2

(12) United States Patent
Kida et al.

(10) Patent No.: US 10,386,964 B2
(45) Date of Patent: Aug. 20, 2019

(54) DISPLAY DEVICE FITTED WITH POSITION INPUT FUNCTION

(71) Applicant: Sharp Kabushiki Kaisha, Sakai, Osaka (JP)

(72) Inventors: Kazutoshi Kida, Sakai (JP); Kenshi Tada, Sakai (JP); Yasuhiro Sugita, Sakai (JP); Hiroyuki Ogawa, Sakai (JP); Takenori Maruyama, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 169 days.

(21) Appl. No.: 15/529,504

(22) PCT Filed: Nov. 20, 2015

(86) PCT No.: PCT/JP2015/082652
§ 371 (c)(1),
(2) Date: May 25, 2017

(87) PCT Pub. No.: WO2016/084725
PCT Pub. Date: Jun. 2, 2016

(65) Prior Publication Data
US 2017/0262132 A1    Sep. 14, 2017

(30) Foreign Application Priority Data
Nov. 28, 2014    (JP) ................................. 2014-241325

(51) Int. Cl.
G06F 3/041    (2006.01)
G02F 1/1333    (2006.01)
(Continued)

(52) U.S. Cl.
CPC .......... *G06F 3/0418* (2013.01); *G02F 1/1368* (2013.01); *G02F 1/13338* (2013.01);
(Continued)

(58) Field of Classification Search
CPC ............ G02F 1/1368; G02F 1/134336; G02F 1/13338; G02F 1/133707; G02F 2201/121;G02F 2201/123; G06F 3/0412; G06F 3/0416; G06F 3/0418; G06F 3/044; G09G 3/20; G09G 3/3688; G09G 3/3677;
(Continued)

(56) References Cited

U.S. PATENT DOCUMENTS 8,933,895 B2    1/2015 Nakanishi et al.
2010/0328274 A1* 12/2010 Noguchi ............. G02F 1/13338
345/204
(Continued)

FOREIGN PATENT DOCUMENTS

JP    2011-013760 A    1/2011
JP    2012-042862 A    3/2012
(Continued)

*Primary Examiner* — Amare Mengistu
*Assistant Examiner* — Jennifer L Zubajlo
(74) *Attorney, Agent, or Firm* — ScienBiziP, P.C.

(57) ABSTRACT

A crystal display device 10 includes TFTs, pixel electrodes, common electrodes, an array board, a CF board, detection electrodes, drive electrodes, a driver, a row control circuit, and a touch controller. The detection electrodes are included in the CF board. The drive electrodes are included in the CF board. The driver and the row control circuit are included in a display driver portion for supplying scan signals and data signals to the TFTs for display driving. The touch controller supplies drive signals to the drive electrodes and detects position detection signals output by the detection electrodes to perform position detection control. The touch controller supplies the drive signals to the drive electrodes to drive the drive electrodes in a scan writing period in which the scan signals are supplied to the TFTs by at least the row control circuit in the display driver portion to drive the TFTs.

7 Claims, 19 Drawing Sheets

(51) Int. Cl.
- *G06F 3/044* (2006.01)
- *G02F 1/1343* (2006.01)
- *G09G 3/36* (2006.01)
- *G02F 1/1368* (2006.01)
- *G09G 3/20* (2006.01)
- *G02F 1/1337* (2006.01)

(52) U.S. Cl.
CPC ........ *G02F 1/134336* (2013.01); *G06F 3/044* (2013.01); *G06F 3/0412* (2013.01); *G06F 3/0416* (2013.01); *G09G 3/20* (2013.01); *G09G 3/3677* (2013.01); *G09G 3/3688* (2013.01); *G02F 1/133707* (2013.01); *G02F 2201/121* (2013.01); *G02F 2201/123* (2013.01); *G09G 2300/0426* (2013.01); *G09G 2310/08* (2013.01)

(58) Field of Classification Search
CPC ................... G09G 2300/0426; G09G 2310/08
See application file for complete search history.

(56) References Cited

U.S. PATENT DOCUMENTS

| | | | |
|---|---|---|---|
| 2012/0044195 A1* | 2/2012 | Nakanishi | G06F 3/0412 345/174 |
| 2012/0287081 A1* | 11/2012 | Akai | G06F 3/044 345/174 |
| 2013/0093722 A1 | 4/2013 | Noguchi et al. | |
| 2013/0187887 A1* | 7/2013 | Mizuhashi | G06F 3/044 345/174 |
| 2015/0070318 A1 | 3/2015 | Noguchi et al. | |
| 2015/0091868 A1 | 4/2015 | Nakanishi et al. | |
| 2015/0212645 A1 | 7/2015 | Mizuhashi et al. | |
| 2015/0346883 A1 | 12/2015 | Noguchi et al. | |

FOREIGN PATENT DOCUMENTS

| | | |
|---|---|---|
| JP | 2012-234474 A | 11/2012 |
| JP | 2013-084168 A | 5/2013 |
| JP | 2013-149184 A | 8/2013 |

\* cited by examiner

DISPLAY DEVICE FITTED WITH POSITION INPUT FUNCTION

TECHNICAL FIELD

The present invention relates to a display device with a position inputting function.

BACKGROUND ART

In recent years, more and more electronic devices such as tablet personal computers and portable digital assistants include touchscreens to improve operability and usability. A user can enter information on a position on a display surface of the liquid crystal panel by touching the display surface of the liquid crystal panel with a finger or a stylus. According to this configuration, the user can perform intuitive operation, that is, the user can perform operation with direct feeling as if he or she directly touches an image displayed on the liquid crystal panel. A display panel with a position inputting function of such a touchscreen is disclosed in Patent Document 1.

Patent Document 1 discloses a display device including a display unit, a touch detection unit, and a driver unit. The driver unit drives the display unit to sequentially display M horizontal lines in each of plural unit driving periods forming one frame period and drives the touch detection unit in N touch detection periods provided in each unit driving period. N is smaller than M. In the display device, the M horizontal lines are sequentially displayed in the unit driving period and the touch detection unit is driven in the N touch detection periods provided in each unit driving period.

RELATED ART DOCUMENT

Patent Document

Patent Document 1: Unexamined Japanese Patent Application Publication No. 2013-84168

Problem to be Solved by the Invention

In Patent Document 1, signals for touch detection are input to a drive electrode to which signals for image display are input and the touch detection is performed in the touch detection period prior to the display period in the unit driving period. Therefore, flexibility in setting timing to perform the touch detection is low and the touch detection is more likely to be susceptible to noise resulting in a decrease in sensitivity of position detection. Especially, if the unit driving period decreases as definition increases, the touch detection period decreases. Therefore, the position detection period is more likely to decrease. Furthermore, a period for the touch detection increases as a display screen size increases. This has been an unsolved problem.

DISCLOSURE OF THE PRESENT INVENTION

The present invention was made in view of the above circumstances. An object is to improve sensitivity in position detection.

Means for Solving the Problem

A display device with a position inputting function according to the present invention includes display components, pixel electrodes, common electrodes, an array board, a common board, detection electrodes, drive electrodes, a display driver portion, and a position detection controller. The pixel electrodes are connected to the display components. The common electrodes form capacitance with the pixel electrodes. At least the display components are on the array board. The common board is opposed to the array board with a gap therebetween. The detection electrodes are on the common board. The detection electrodes extend in a direction along a plate surface of the common board. The drive electrodes are on the common board. The drive electrodes extend in a direction along the plate surface of the common board and perpendicular to the direction in which the detection electrodes extend and overlapping the detection electrodes in a plan view. The driver electrodes form capacitance with the detection electrodes that overlap the drive electrodes. The display driver portion is for supplying scan signals and data signals to the display components for display deriving. The position detection controller is for supplying drive signals to the drive electrodes and detecting position detection signals that are output by the detection electrodes to perform position detection control. The position detection controller is configured to supply the drive signals to the drive electrodes in a scan writing period in which the scan signals are supplied to the display components by the display driver portion to drive the display components.

Because the display driver portion supplies the scan signals and the data signals to the display electrodes at predefined timing to chart the pixel electrodes connected to the display components, potential differences are produced between the pixel electrodes and the common electrodes. According to the configuration, images are displayed. The position detection controller supplies the drive signals to the drive electrodes to drive the drive electrodes and detects the positon detection signals that are output by the detection electrodes to obtain potion information input by the user to detect input positions. The position detection controller supplies the drive signals to the drive electrodes to drive the drive electrodes in the scan writing period in which the scan signals are supplied to the display components at least by the display drive portion to drive the display components. In comparison to the conventional configuration in which the drive signals are supplied in a period outside the scan writing period, higher flexibility can be achieved in timing at which the position detection signals that are output by the detection electrodes. Namely, the position detection timing can be synchronized with timing at which noise is less likely to be produced according to image display and thus higher sensitivity in position detection can be achieved.

Furthermore, the drive signals are supplied to the drive electrodes to drive the drive electrodes in the scan writing period. Therefore, even if the display period and the period outside the scan writing period decrease as the definition increases, a sufficiently high sensitivity can be achieved in the position detection. Even if a period required for the position detection increases as the screen size increases, the period is properly assured. Conventionally, the position detection is performed using the common electrodes for image display and thus a circuit for switching the image display and the position detection is required. Such a circuit needs to be arranged in the non-display area of the array board. As described above, the position detection is performed using the detection electrodes different from the common electrodes. Therefore, a circuit for switching the image display and the position detection is not required.

According to the configuration, a width of the non-display area can be reduced. Namely, this configuration is preferable for reducing a frame size.

Preferred embodiments of the present invention may include the following configurations.

(1) The display driver portion may be configured to output a multiplexed data signal including multiple data signals that are multiplexed and a division control signal for driving the multiplexed data signal into the multiple data signals. The display device may further include a division controller configured to receive the multiplexed data signal and the division control signal that are output by the display driver portion and to separate the multiple data signals from the multiplexed data signal based on the division control signal to supply the display components with time division. The position detection controller may be configured to supply the drive signals to the drive electrodes across multiple data writing periods in which the multiple data signals separated by the division controller with the time division and supplied the data signals to the multiple display components to drive the drive electrodes and to detect the position detection signals that are output by the detection electrodes at timing at which the data writing periods end. According to the configuration, the division controller separates the multiple data signals from the multiplexed data signal based on the division control signal to supply the data signals to the display components with time division to drive the display components. Therefore, the number of lines for connection between the display driver portion and the division controller can be reduced. In data writing periods in which the data signals may be supplied to the display components by the division controller, noise is more likely to be produced. The position detection controller may supply the drive signals to the drive electrodes across multiple data writing periods to drive the drive electrodes and detect the position detection signals that are output by the detection electrodes at the timing at which the data writing periods end. Therefore, the position detection can be performed without being affected by the noise that may be produced in the data writing periods. Namely, higher sensitivity can be achieved in the position detection.

(2) The display driver portion may be configured to perform the display driving such that a display period includes the scan writing period and a non-driving period in which driving of the display components is halted. The position detection controller may be configured to supply the drive signals to the drive electrodes across the scan writing period and the non-driving period to drive the drive electrodes and to detect the position detection signals that are output by the detection electrodes in the non-driving period. According to the configuration, in the non-driving period included in the display period, the driving of the display components is halted and thus noise is less likely to be produced. The position detection controller may supply the drive signals to the drive electrode across the scan writing period and the non-driving period to drive the drive electrodes and detect the position detection signals that are output by the detection electrodes in the non-driving period. Therefore, the position detection is less likely to be affected by the noise and thus higher sensitivity can be achieved in the position detection.

(3) The position detection controller may be configured to supply the drive signals to the drive electrodes multiple times in the scan writing period. According to the configuration, the position detection is performed multiple times in one scan writing period and thus results of the position detection can be statistically analyzed. Therefore, a reduction in sensitivity of the position detection due to variations in result of the position detection can be restricted.

(4) The display components may be arranged in a matrix along the plate surface of the array board. The display driver portion may be configured to supply the scan signals to scan the display components arranged in a matrix in sequence along a row direction to drive the display components. The position detection controller may be configured to supply the drive signals to the drive electrodes to drive the drive electrodes in scan writing periods present in sequence. According to the configuration, the display components arranged in the matrix are driven with the scan signals supplied in sequence to scan the display components along the row direction. The drive electrodes are driven with the drive signals supplied to the drive electrodes in the scan writing periods present in sequence. Therefore the position detection signals based on the drive signals are repeatedly detected in every scan writing period and thus higher sensitivity can be achieved in the position detection.

(5) The display components may be arranged in a matrix along the plate surface of the array board. The display deriver portion may be configured to supply the scan signals to scan the display components arranged in the matrix in sequence along a row direction to drive the display components. The position detection controller may be configured to supply the drive signals to the drive electrodes to drive the drive electrodes in one scan writing period selected from consecutive multiple scan writing periods. According to the configuration, even if the scan writing period decreases as the definition increases and the period required for the position detection increases as the screen size increases, the period required for the position detection can be properly assured. This configuration is preferable for increasing the definition and the screen size.

(6) The display components may be arranged in a matrix along the plate surface of the array board. The display driver portion may be configured to supply the scan signals to scan the display components arranged in the matrix in sequence along a row direction to drive the display components. The position detection controller may be configured to supply the drive signals to the drive electrodes to drive the drive electrodes across consecutive multiple scan writing periods. According to the configuration, even if the scan writing period decreases as the definition increases and the period required for the position detection increases as the screen size increases, the period required for the position detection can be properly assured. This configuration is preferable for increasing the definition and the screen size.

(7) The pixel electrodes and the common electrodes may be disposed on a plate surface of the array board on a common board side. The detection electrodes may be disposed on one of plate surfaces of the common board. The drive electrodes may be disposed on another one of the plate surfaces of the common board. This configuration is preferable for a display device that operates in fringe field switching (FFS) mode or in-plane switching (IPS) mode.

Advantageous Effect of the Invention

According to the present invention, sensitivity in position detection can be improved.

MODE FOR CARRYING OUT THE INVENTION

<First Embodiment>

Figure 1:
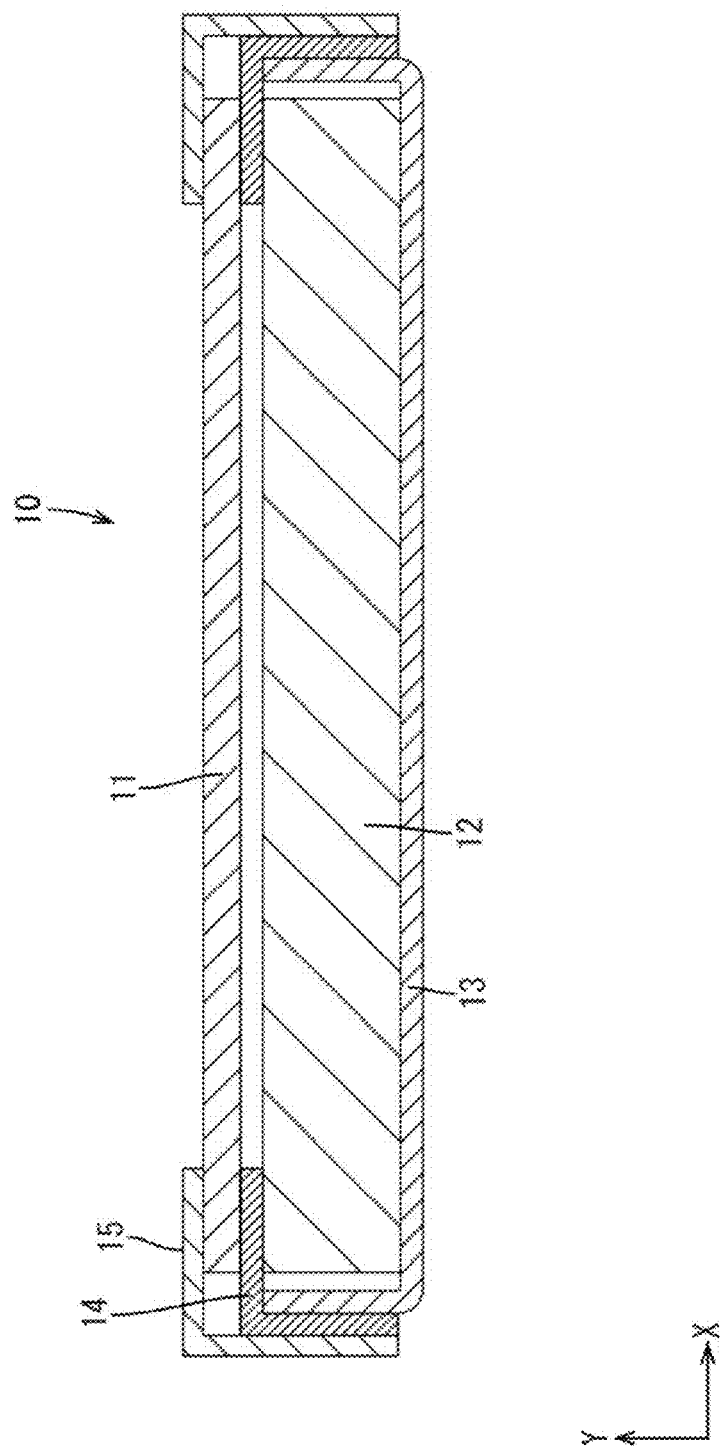
FIG. 1 is a cross-sectional view of a liquid crystal panel according to a first embodiment of the present invention.

A first embodiment of the present invention will be described with reference to FIGS. 1 to 14. In this section, a liquid crystal display device 10 with a position inputting function (a display device with a position inputting function) will be described. X-axes, Y-axes, and Z-axes may be present in the drawings. The axes in each drawing correspond to the respective axes in other drawings. The vertical direction is based on FIG. 2. An upper side and a lower side in FIG. 2 correspond to a front side and a back side of the liquid crystal display device 10, respectively.

Figure 2:
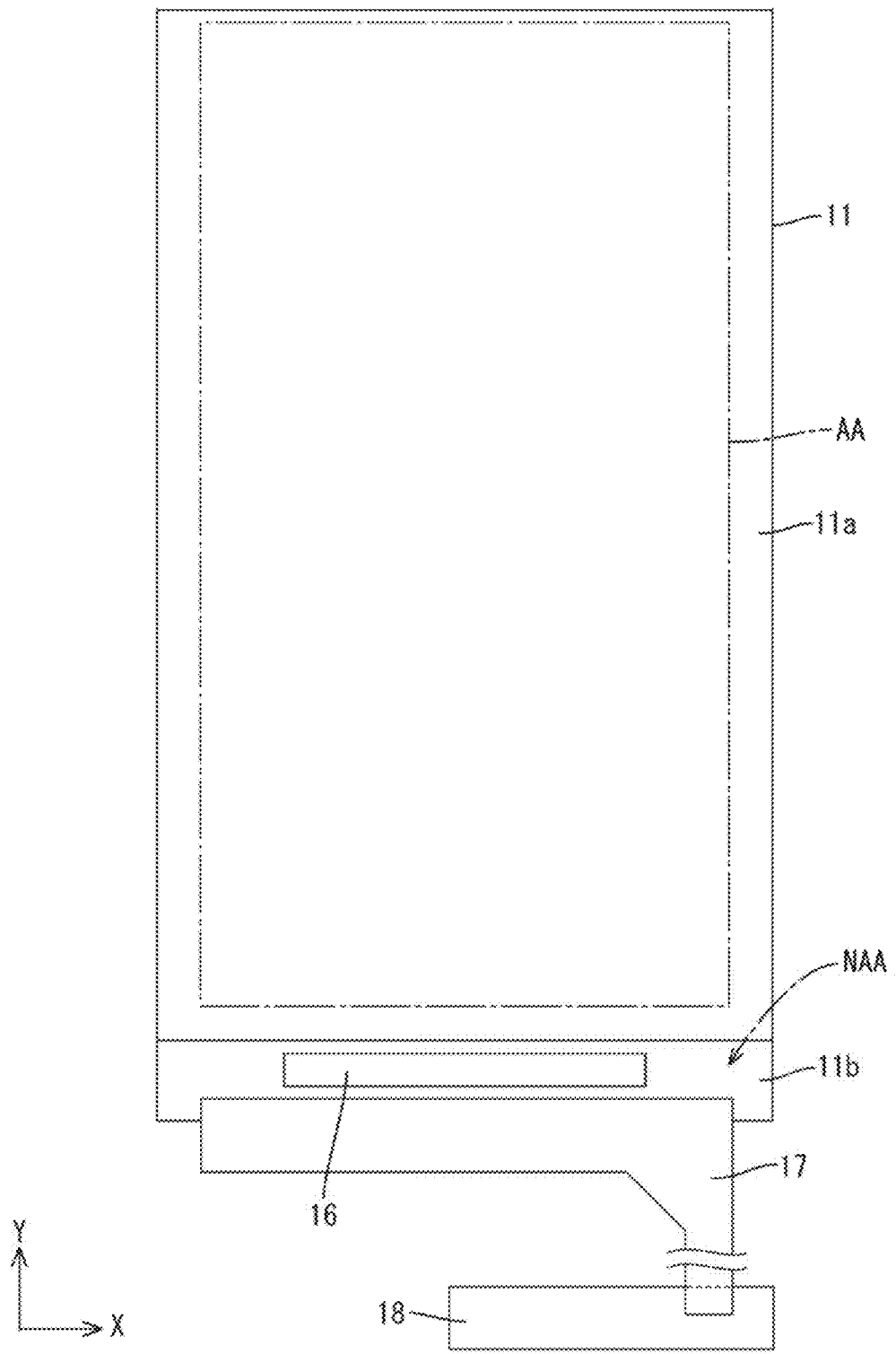
FIG. 2 is a plan view of a liquid crystal panel included in the liquid crystal display device.

As illustrated in FIGS. 1 and 2, the liquid crystal display device 10 includes a liquid crystal panel 11 (a display panel with a position inputting function) and a backlight unit 12 (a lighting device). The liquid crystal panel 11 is for display images and for detecting position information input by a user based on the images. The backlight unit 12 is an external light source for supplying light to the liquid crystal panel 11 used for image display. The liquid crystal display device 10 further includes a chassis 13, a frame 14, and a bezel 15 (a holding member). The chassis 13 holds the backlight unit 12 therein. The frame 14 holds the backlight unit 12 together with the chassis 13. The bezel 15 holds the liquid crystal panel 11 together with the frame 14. The backlight unit 12 includes at least a light source (e.g., cold cathode fluorescent tubes, LEDs, organic ELs) and an optical member having an optical function for converting light emitted by the light source into planar light.

The liquid crystal display device 10 according to this embodiment may be for various electronic devices (not illustrated) including mobile phones (including smartphones), notebook personal computers (including tablet personal computers), portable information terminals (including electronic books and PDAs), digital photo frames, and portable video game players. Therefore, a screen size of the liquid crystal panel 11 in the liquid crystal display device 10 may be some inches to 10 plus some inches, which is usually categorized as a small size display or a small-to-medium size display.

The liquid crystal panel 11 will be described. As illustrated in FIG. 2, the liquid crystal panel 11 has a vertically-long rectangular overall shape with a long-side direction and a short-side direction correspond with the Y-axis direction and the X-axis direction, respectively. The liquid crystal panel 11 includes a display area (an active area) AA and a non-display area (a non-active area) NAA. The display area AA is an area in which images are displayed and the non-display area NAA is an area in which the images are not displayed. The non-display area NAA has a picture frame shape (a frame shape) surrounding the display area AA. The display area AA is located closer to an edge of the liquid crystal panel 11 with respect to the long-side direction (on an upper side in FIG. 2). The non-display area NAA includes an area having a substantially frame shape surrounding the display area AA (a frame portion of a CF board 11a, which will be described later) and an area at the other end with respect to the long-side direction (on a lower side in FIG. 2, an exposed area of an array board 11b which does not overlap the CF board 11a and will be described later). The exposed area is a mounting area for a driver 16 (a display driver, a source driver) for driving the liquid crystal panel and a flexible circuit board 17 (an external connecting component). The flexible circuit board 17 has flexibility. The flexible circuit board 17 connects the liquid crystal panel 11 to a control circuit board 18 that is an external signal source. Various signals are transmitted from the control circuit board 18 to the driver 16 or other components via the flexible circuit board 17. The driver 16 includes an LSI chip containing a driver circuit therein. The driver 16 processes input signals from the control circuit board 18 and produces output signals. The driver 16 inputs the output signals to a column control circuit 37a, which will be described later. In FIG. 2, an outline of the display area AA having a frame shape slightly smaller than the CF board 11a is indicated with a chain line. An area outside the chain line is the non-display area NAA.

Figure 7:
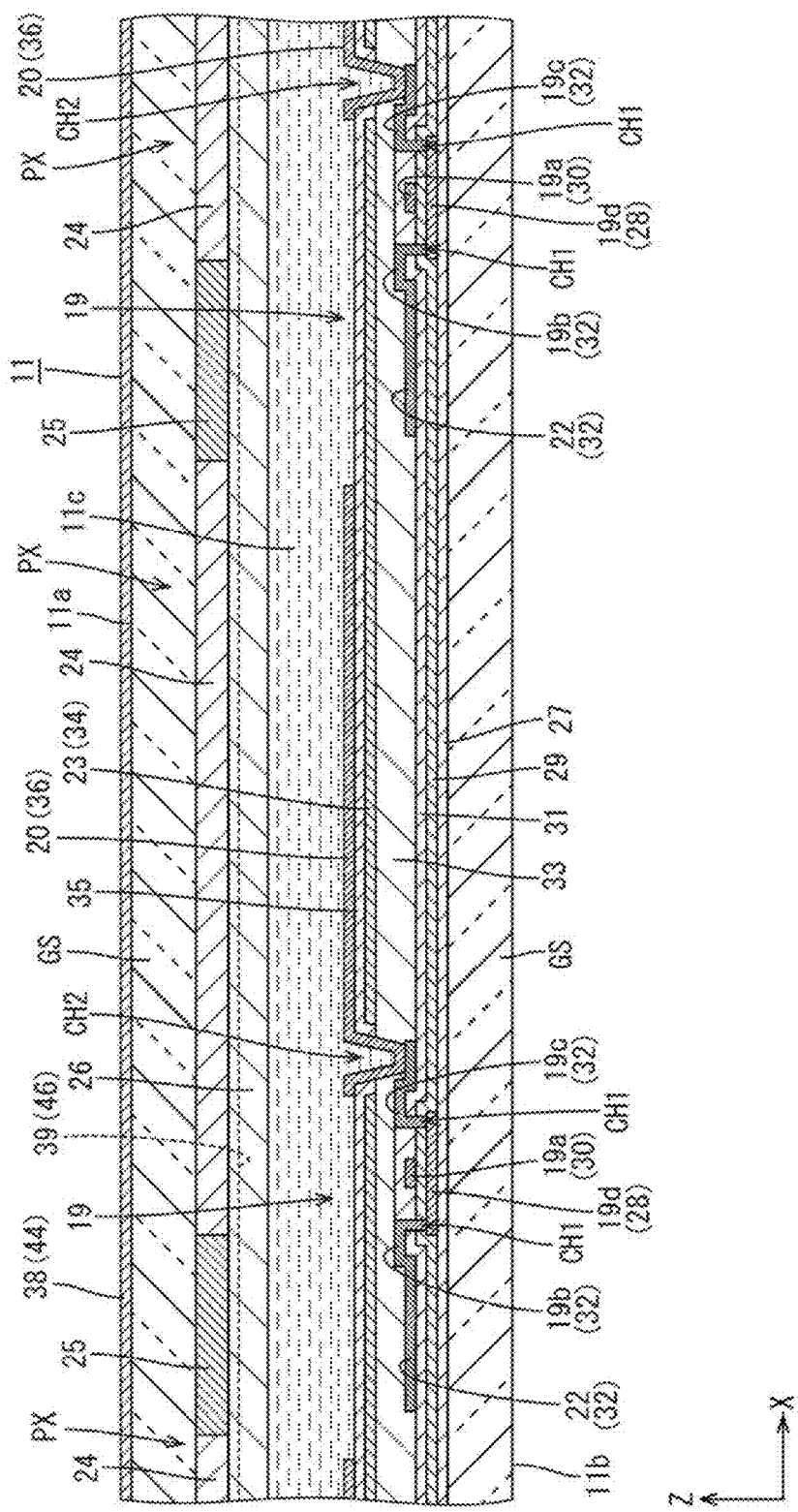
FIG. 7 is a cross-sectional view along line vii-vii in FIG. 6.

As illustrated in FIGS. 2 and 7, the liquid crystal panel 11 includes a pair of boards 11a and 11b and a liquid crystal layer 11c (liquid crystals) between the boards 11a and 11b. The liquid crystal layer 11c contains liquid crystal molecules that are substances having optical characteristics that change according to application of an electric field. The boards 11a and 11b are bonded together with a sealing member, which is not illustrated, with a gap corresponding to a thickness of the liquid crystal layer 11c maintained therebetween. One of the boards 11a and 11b on the front side is the CF board 11a (a common board) and the other on the rear side (back side) is the array board 11b (a component board, an active matrix board). The CF board 11a and the array board 11b include substantially transparent glass substrates GS (having high light transmissivity) and various films formed on the glass substrates GS by a known photolithography method. As illustrated in FIG. 2, the CF board IIa has a short dimension about equal to a short dimension of the array board 11b and a long dimension smaller than a long dimension of the array board 11b. The CF board IIa is bonded to the array board 11b with one of ends of the CF board 11a with respect to the long-side direction (on the upper side in FIG. 2) is aligned with a corresponding end of the array board 11b. A predefined area of the other end of the array board 11b with respect to the long-side direction (on the lower side in FIG. 2) does not overlap the CF board 11a. A front plate surface and a rear plate surface of the predefined area of the array board 11b are exposed to the outside. The predefined area includes the mounting area for mounting the driver 16 and the flexible circuit board 17. Alignment films (not illustrated) for adjustment of orientations of the liquid crystal molecules in the liquid crystal layer 11c are formed to directly face the liquid crystal layer 11c. Polarizing plates (not illustrated) are attached to outer surfaces of the boards 11a and 11b.

Figure 6:
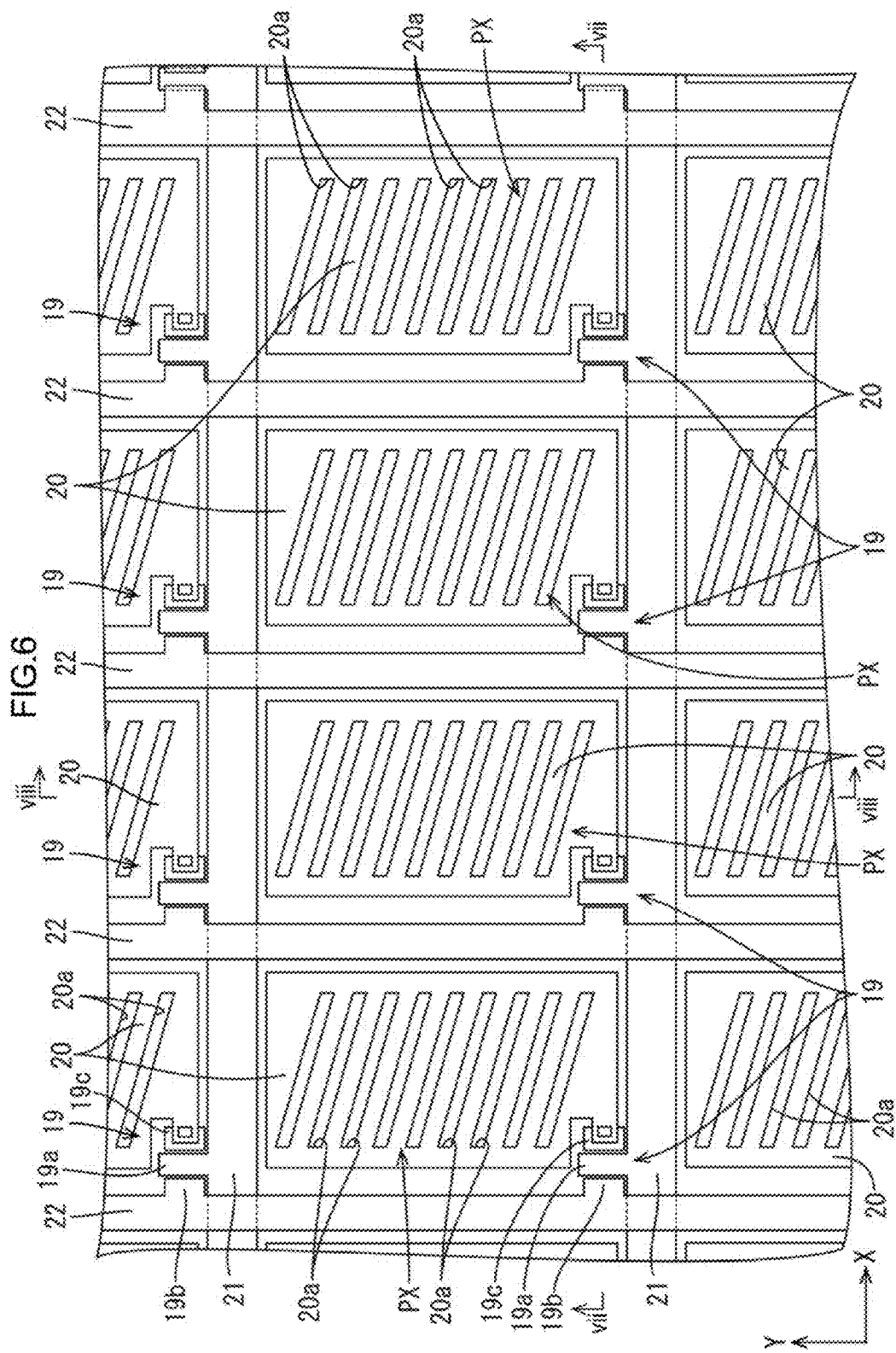
FIG. 6 is a magnified plan view of a central portion of the array board.

Configurations of portions of the array board 11b and the CF board 11a in the display area AA will be briefly described. As illustrated in FIGS. 6 and 7, thin film transistors (TFTs, display components) 19 and pixel electrodes 20 are arranged in a matrix in an area of an inner surface of the array board 11b (on a liquid crystal layer 11c side, on an opposed surface side opposed to the CF board 11a) in the display area AA. The TFTs are switching components. Gate lines 21 and source lines 22 are routed in a grid to surround the TFTs 19 and the pixel electrodes 20. The TFTs 19 and the pixel electrodes 20 are arranged at intersections of the gate lines 21 and the source lines 22 routed in the grid to form the matrix. The gate lines 21 extend along the X-axis direction (a row direction). The gate lines 21 are arranged at intervals along the Y-axis direction (a column direction). The source lines 22 extend along the Y-axis direction. The source lines 22 are arranged at intervals along the X-axis direction. The gate lines 21 are connected to gate electrodes 19a of the TFTs 19 and the source lines 22 are connected to source electrodes 19b of the TFTs 19. The pixel electrodes 20 are connected to drain electrodes 19c of the TFTs 19. The gate lines 21 transmit scan signals Vscan supplied to the gate electrodes 19a of the TFTs 19. The source lines 22 transmit data signals Vpix supplied to the source electrodes 19b of the TFTs 19. The TFTs 19, the pixel electrodes 20, the gate lines 21, and the source lines 22 are included in a display circuit that is a circuit for displaying images. A detailed configuration of the TFTs 19 will be described later. Each pixel electrode 20 has a vertically-long rectangular shape in a plan view. The array board 11b includes common electrodes 23. Electric fields are produced between the pixel electrodes 20 and the common electrodes 23 when a common potential (a reference potential) is applied to the common electrodes 23. Namely, the liquid crystal panel 11a ccording to this embodiment operates in fringe field switching (FFS) mode that is an improved mode of an in-plane switching (IPS) mode. The array board 11b includes the pixel electrodes 20 and the common electrodes 23 that are formed in different layers. Each pixel electrode 20 includes slits 20a formed at intervals to extend in a slanting direction relative to the X-axis direction and the Y-axis direction in a plan view. With the slits 20a, when a potential difference is produced between the pixel electrode 20 and the common electrode 23 that are formed in the different layer, a fringe electric field (an oblique electric field) including a component along a plate surface of the array board 11b and a component along a direction normal to the plate surface of the array board 11b is applied. Orientations of the liquid crystal molecules in the liquid crystal layer 11c can be properly adjusted using the fringe electric field.

As illustrated in FIG. 7, the CF board 11a includes color filters 24 formed in an area of an inner surface of the CF board 11a (on a liquid crystal layer 11c side, on an opposed side opposed to the array board 11b) in the display area AA. The color filters 24 include red (R), green (G), and blue (B) color portions arranged in a matrix to overlap the pixel electrodes 20 of the array board 11b in a plan view. A light blocking portion 25 (a black matrix) is formed in a grid to extend among the color portions of the color filters for reducing color mixture. The light blocking portion 25 are arranged to overlap the gate lines 21 and the source lines 22 in the plan view. A planarization film 26 (a protective film, an overcoat film) is formed on surfaces of the color filters 24 and the light blocking portion 25. In the liquid crystal panel 11, one display pixel, which is a unit of image display, includes three color portions of red (R), green (G), and blue (B) and three pixel electrodes 20 opposed to the color portions. Each display pixel includes three pixel portions PX of R, G, and B. Each pixel portion PX includes the pixel electrode 20 and the color portion opposed to the pixel electrode 20. The pixel portions PX are repeatedly arranged within a plate surface of the liquid crystal panel 11a long the row direction (the X-axis direction). Lines of the pixel portions PX are arranged along the column direction (the Y-axis direction). The light blocking portion 25 is arranged to separate the adjacent pixel portions PX from each other.

Next, a configuration of the various films formed in layers on the inner surface side of the array board 11b by the known photolithography method will be described in detail The configuration includes a sequence of the layers. The array board 11b mainly includes components for performing a function for displaying images (a display function), which is one of functions of the liquid crystal panel 11. Specifically, as illustrated in FIG. 7, the array board 11b includes a basecoat film 27, a semiconductor film 28, a gate insulating film 29 (an inorganic insulating film), a first metal film 30 (a gate metal film), a first interlayer insulating film 31 (an inorganic insulating film), a second metal film 32 (a source metal film), a planarization film 33 (an organic insulating film), a first transparent electrode film 34, a second interlayer insulating film 35 (an inorganic insulating film), and a second transparent electrode film 36 in this sequence from a lower layer side (a glass substrate GS side, the rear side). Although not illustrated, the alignment film is formed over the second interlayer insulating film 35 and the second transparent electrode film 36.

The basecoat film 27 is formed in a solid pattern to cover an entire surface of the glass substrate GS of the array board 11b. The basecoat film 27 is made of silicon oxide ($SiO_2$), silicon nitride (SiNx), or silicon oxide nitride. The semiconductor film 28 is formed over the basecoat film 27 and in a pattern to be arranged in the display area AA and the non-display area NAA. The semiconductor film 28 is formed in an island pattern that corresponds to arrangement of the TFTs 19, which will be described later, at least in the display area AA. The semiconductor film 28 is formed from continuous grain (CG) silicon thin film, which is a kind of silicon thin films having polycrystalline structures (polycrystalline silicon thin films). The CG silicon thin film may be formed by adding a metal material to the amorphous silicon thin film and by performing thermal processing at low temperature of 550° C. or lower for a short period. Therefore, atomic arrangement at crystal grain boundaries of silicon crystals has continuity. The gate insulating film 29 is formed above the basecoat film 27 and the semiconductor film 28 in a solid pattern across the display area AA and the non-display area NAA. The gate insulating film 29 may be made of silicon oxide (SiO2).

The first metal film 30 is formed above the gate insulating film 29 and in a pattern to be arranged in the display area AA and the non-display area NAA. The first metal film 30 may be formed from a multilayer film of titanium (Ti) and copper (Cu). The gate lines 21 and the gate electrodes 19a are formed from the first metal film 30. The first interlayer insulating film 31 is formed above the gate insulating film 29 and the first metal film 30. The first interlayer insulating film 31 is formed in a solid pattern across the display area AA and the non-display area NAA. The first interlayer insulating film 31 may be made of silicon oxide (SiO2). Intersections between the gate lines 21 and the source lines 22 are insulated with the first interlayer insulating film 31. The second metal film 32 is formed above the first interlayer insulating film 31. The second metal film 32 is formed in a pattern to be arranged in the display area AA and the non-display area NAA. The second metal film 32 may be formed from a multilayer film of titanium (Ti) and copper (Cu). The source lines 22, the source electrodes 19b, and the drain electrodes 19c are formed from the second metal film 32. The planarization film 33 is formed above the first interlayer insulating film 31 and the second metal film 32. The planarization film 33 is formed in a solid pattern across the display area AA and the non-display area NAA. The planarization film 33 may be made of acrylic resin such as polymethylmethacrylate (PMMA). The planarization film 33 has a thickness larger than thicknesses of the insulating films 29, 31, and 35, which are inorganic insulating films. Therefore, the planarization film 33 properly planarizes a surface of the array board 11b on the liquid crystal layer 11c side (on which the alignment film is formed).

The first transparent electrode film 34 is formed above the planarization film 33. The first transparent electrode film 34 is formed in a substantially solid pattern at least in the display area AA. The first transparent electrode film 34 may be made of transparent electrode material such as indium tin oxide (ITO) and zinc oxide (ZnO). The common electrodes 23 in a substantially solid pattern are formed from the first transparent electrode film 34. The second interlayer insulating film 35 is formed above the planarization film 33 and the first transparent electrode film 34. The second interlayer insulating film 35 is formed in a solid pattern across the display area AA and the non-display area NAA. The second interlayer insulating film 35 may be made of silicon nitride (SiNx). The second transparent electrode film 36 is formed above the second interlayer insulating film 35. The second transparent electrode film 36 is formed in an island pattern that corresponds to the arrangement of the TFTs 19 in the display area AA. The second transparent electrode film 36 may be made of transparent electrode material such as indium tin oxide (ITO) and zinc oxide (ZnO). The pixel electrodes 20 are formed from the second transparent electrode film 36. The gate insulating film 29, the first interlayer insulating film 31, the planarization film 33, and the second interlayer insulating film 35 include holes. The holes include contact holes CH1 and CH2 that are formed at predefined positions by patterning in the production process of the array board 11b.

As illustrated in FIG. 7, each TFT 19 of the array board 11b in the display area AA includes a channel 19d, the gate electrode 19a, the source electrode 19b, and the drain electrode 19c. The channel 19d is formed from the semiconductor film 28. The gate electrode 19a is over the channel 19d with the gate insulating film 29 therebetween. The source electrode 19b and the drain electrode 19c are above the gate electrode 19a with the first interlayer insulating film 31 between the gate electrode 19a and the source electrode 19b or the drain electrode 19c. The TFTs 19 are top-gate (staggered-type) transistors. Each source electrode 19b and each drain electrode 19c are connected to the corresponding channel 19d through the contact holes CH1 that are formed in the gate insulating film 29 and the first interlayer insulating film 31. According to the configuration, electrons can be movable between the source electrode 19b and the drain electrode 19c. The semiconductor film 28 that forms the channel 19d is formed from the CG silicon thin film. The CG silicon thin film has electron mobility of, for example, 200 to 300 cm2/Vs, which is higher than electron mobility of an amorphous silicon thin film. Therefore, by forming the channel 19d of the TFT 19 from the semiconductor film 28 formed from the CG silicon thin film, the size of the TFT 19 can be reduced and the amount of transmitting light through the semiconductor film 28 can be maximized. This configuration is preferable for improving definition and reducing power consumption. Each pixel electrode 20 that is formed from the second transparent electrode film 36 is connected to the drain electrode 19c of the corresponding TFT 19 via the contact holes CH2 that are formed in the planarization film 33 and the second interlayer insulating film 35. When the gate electrode 19a of the TFT 19 is conducted, a current flows between the source electrode 19b and the drain electrode 19c via the channel 19d and a predefined potential is applied to the pixel electrode 20. The common electrodes 23 that are formed from the first transparent electrode film 34 overlap the respective pixel electrodes 20 in a plan view with the second interlayer insulating film 35 therebetween. As described earlier, the common electrodes 23 that are formed in the solid pattern includes holes at positions that correspond to the contact holes CH2 in the planarization film 33 and the second interlayer insulating film 35 in the plan view for passing contact portions of the pixel electrodes 20.

Figure 3:
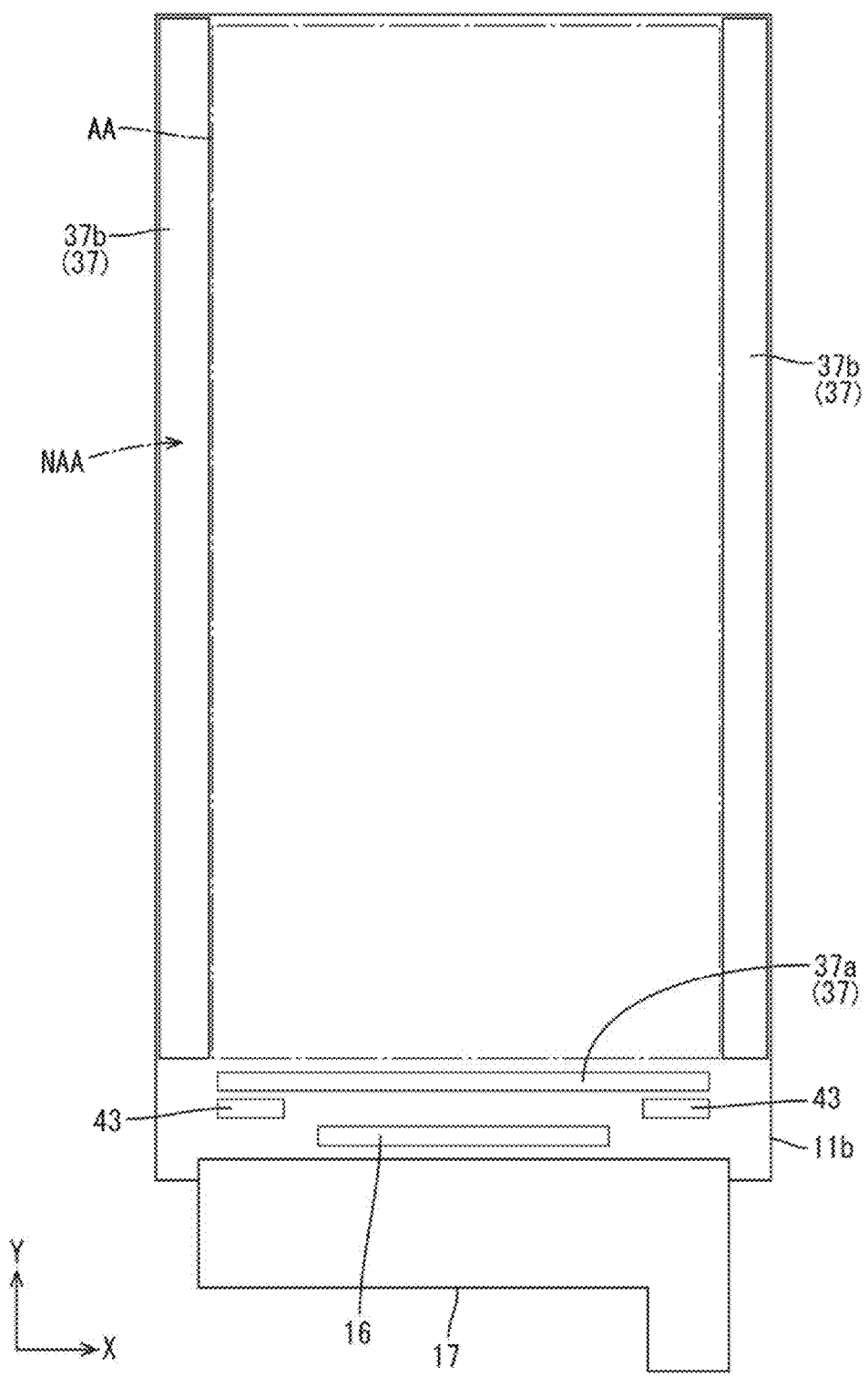
FIG. 3 is a plan view of an array board included in the liquid crystal panel.

Next, a configuration of portions of the array board 11b in the non-display area NAA will be described. As illustrated in FIG. 3, monolithic circuits 37 (a display driver portion) are arranged in the portions of the array board 11b in the non-display area NAA adjacent to the display area AA. The monolithic circuits 37 are for driving the TFTs 19 in the display area AA for image display. Each monolithic circuit 37 is monolithically formed on the array board 11b with the semiconductor film 28 as a base. The semiconductor film 28 is the film used for the TFTs 19 in the display area AA. The monolithic circuits 37 include control circuits for controlling supply of signals to the TFTs 19 and components of the control circuits. The components of the control circuits include circuit TFTs (circuit thin film transistors) which use the semiconductor film 28 as channels. The circuit TFTs are not illustrated. The control circuits include circuit lines that are formed from the first metal film 30 and the second metal film 32. The monolithic circuits 37 include the column control circuit 37a (a column display driver, a division controller) adjacent to a short edge of the display area AA and row control circuits 37b (a row display driver portion, a display driver portion) adjacent to long edges of the display area AA, respectively.

As illustrated in FIG. 3, the column control circuit 37a is arranged adjacent to a lower short edge of the display area AA in FIG. 3, that is, between the display area AA and the driver 16 with respect to the Y-axis direction. The column control circuit 37a is formed in a horizontally-rectangular area that extends along the X-axis direction. The column control circuit 37a is connected to the driver 16 via connecting lines, which are not illustrated, formed on the array board 11b. The column control circuit 37a is connected to the source lines 22 that are routed out of the display area AA. The column control circuit 37a includes a selector switch circuit (an RGB switch circuit) for dividing a multiplexed data signal Vsig included in an output signal of the driver 16 into data signals Vpix and for selectively distributing the data signals Vpix to the source lines 22, respectively. Specifically, the source lines 22 are arranged along the X-axis direction in the portion of the array board 11b in the display area AA and connected to the respective TFTs 19 that form the pixel portions PX of red (R), green (G), and blue (B). The driver 16 outputs the multiplexed data signal Vsig and a division control signal Vsel (a selection control signal) to the column control circuit 37a. Three data signals Vpix (VpixR, VpixG, VpixB) supplied to the pixel portions PX of R, G, and B are combined into the multiplexed data signal Vsig. The division control signal Vsel is for dividing the multiplexed data signal Vsig into (or for selecting) the data signals VpixR, Vpix G, and VpixB. The column control circuit 37a divides the multiplexed data signal Vsig into three data signals VpixR, VpixG, and VpixB through the selector switch circuit based on the division control signal Vsel output from the driver 16. The column control circuit 37a selectively supplies the data signals VpixR, VpixG, and VpixB to the source lines 22 connected to the respective pixel portions PX of R, G and B. According to the configuration, in comparison to a configuration in which data signals are supplied to the source lines 22 without being combined, the number of connecting lines for connecting the column control circuit 37a to the driver 16 can be reduced to about ⅓. This configuration is preferable for improving the definition.

As illustrated in FIG. 3, the row control circuits 37b are arranged to sandwich the display area AA with respect to the X-axis direction. The row control circuits 37b extend for about an entire length of the display area AA along the Y-axis direction. The row control circuits 37b are connected to the flexible circuit board 17 via connecting lines, which are not illustrate, formed on the array board 11b. The row control circuits 37b are connected to the gate lines 21 that are routed out of the display area AA and thus signals from the control circuit board 18 are supplied to the gate lines 21, respectively. The row control circuits 37b include scanning circuits for scanning the gate lines 21 in sequence by supplying scanning signals Vscan that are included in output signals of the control circuit board 18 to the gate lines 21 at predefined timing. Specifically, the row control circuits 37b use the scan circuits to supply the scan signals Vscan to the gate lines 21 from the top to the bottom with respect to the Y-axis direction in FIG. 3 in sequence in the display area AA. As a result, the gate lines 21 (lines of the TFTs 19) arranged in the Y-axis direction (the column direction) are scanned. The TFTs 19 that are arranged along the X-axis direction (the row direction) are connected to the gate lines 21. Therefore, when the scan signal Vscan is supplied to the gate line 21, the TFTs 19 that are included in one line and connected to the gate line 21 are collectively selected and driven. A scanning direction of the TFTs 19 by the row control circuits 37b corresponds with the Y-axis direction.

Figure 4:
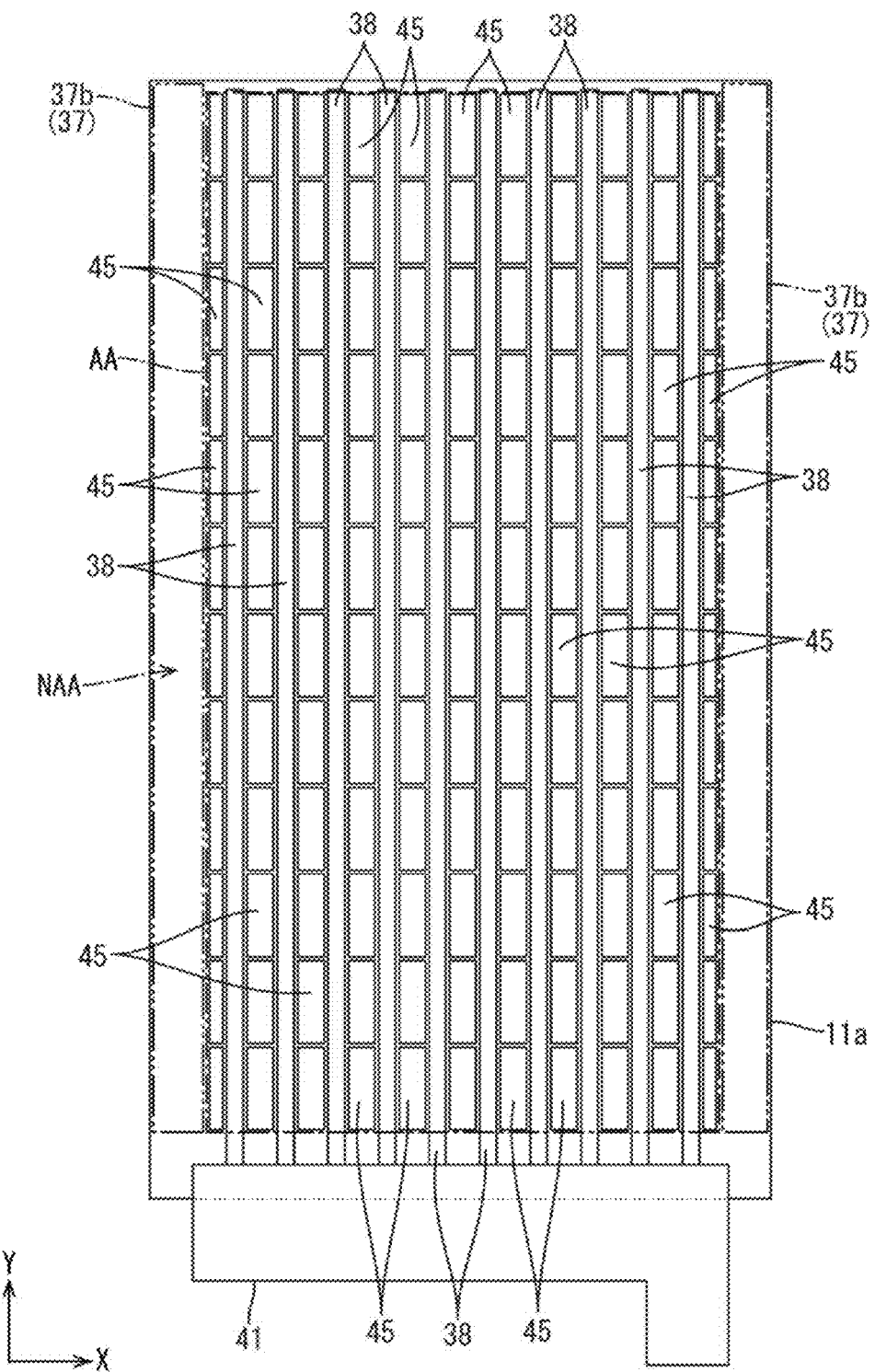
FIG. 4 is a plan view of a CF board included in the liquid crystal panel.
Figure 5:
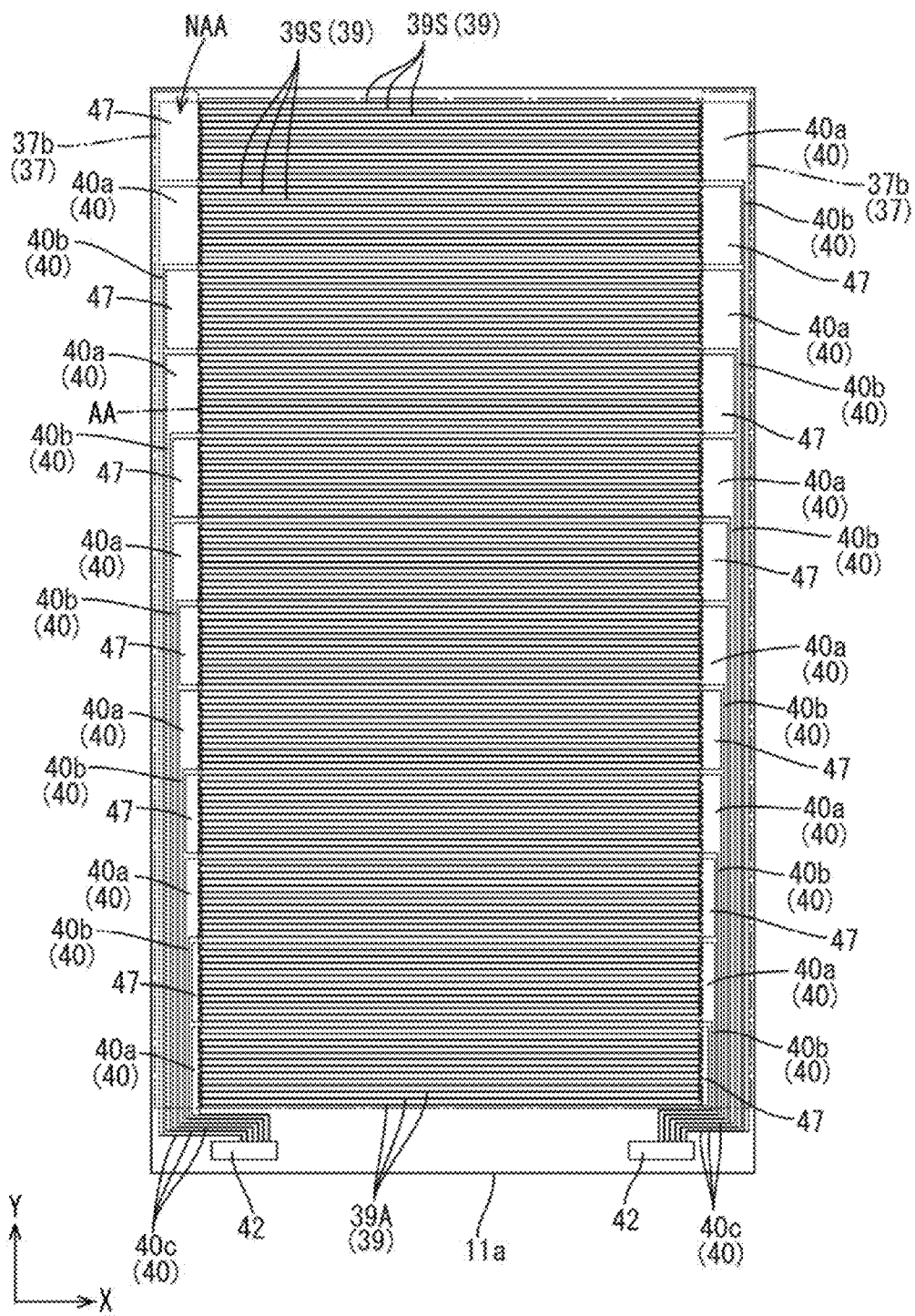
FIG. 5 is a bottom view of the CF board included in the liquid crystal panel.

As described earlier, the liquid crystal panel 11a according to this embodiment includes the display function and the position inputting function (the position detecting function). The display function is for image display. The position inputting function is for detecting position information, which is input by the user, based on a displayed image. The liquid crystal panel 11 includes a touchscreen pattern TPP (a position inputting device, a position detecting device) for performing the position inputting function. The touchscreen pattern TPP is embedded in the liquid crystal panel 11 (with the in-cell technology). The touchscreen pattern TPP uses the projection-type capacitive touchscreen technology, that is, a mutual capacitive detection method. The touchscreen pattern TPP is included only in the CF board 11a. Specifically, as illustrated in FIGS. 4 and 5, the touchscreen pattern TPP includes at least detection electrodes 38 (first position detection electrodes, receiving electrodes) and drive electrodes 39 (second position detection electrodes, transmitting electrodes). The detection electrodes 38 are arranged on an outer surface side of the CF board 11a (on the side opposite from the liquid crystal layer 11c side, the front side, a display surface side) and the drive electrodes 29 are arranged on an inner surface side of the CF board 11a (on the liquid crystal layer 11c side, the rear side, the side opposite from a display surface side). With the touchscreen pattern TPP, whether or not an input of position (touch operation) is present is detected based on a difference in capacitance between when an object (e.g., a finger of the user) which blocks an electric field between the detection electrode 38 and the drive electrode 39 is present and when the object is not present. The detection electrodes 38 and the drive electrodes 39 included in the touchscreen pattern TPP are arranged in the area of the CF board 11a in the display area AA. The display area AA of the liquid crystal panel 11 substantially corresponds with a touch area in which positions of input are detectable. The non-display area NAA substantially corresponds with a non-touch area in which positions of input are not detectable. In the end portions with respect to the short-side direction (the X-axis direction) which corresponds to the non-touch area of the inner surface of the CF board 11a (the non-display area NAA), position detection lines 40 are formed. The position detection lines 40 are connected to the drive electrodes 39 for transmitting drive signals Vdri to the drive electrodes 39.

As illustrated in FIG. 4, a touchscreen flexible circuit board 41 is connected to the end portion with respect to the long-side direction (the Y-axis direction) which corresponds to the non-touch area of the outer surface of the CF board 11a (the end portion on the lower side in FIGS. 4 and 5). The touchscreen flexible circuit board 41 is for transmitting signals between the control circuit board 18 and the CF board 11a. The touchscreen flexible circuit board 41 overlaps the display flexible circuit board 17 connected to the liquid crystal panel 11 in the plan view. The control circuit board 18 includes a touch controller 48 (a position detection controller) for controlling position detection (see FIG. 13). The touchscreen flexible circuit board 41 transmits the position detection signals Vdet that are output by the detection electrodes 38 in the CF board 11a to the touch controller 48. The CF board 11a includes a pair of CF board-side contacts 42 (a signal supplying portion, a common board-side signal supplying portion) in the non-touch area of the inner surface of the CF board 11a overlapping the touchscreen flexible circuit board 41. The CF board-side contacts 42 are connected to ends of the position detection lines 40 opposite from ends connected to the drive electrodes 39. The array board 11b includes a pair of array board-side contacts 43 (a component board-side signal supplying portion) in the non-touch area of the inner surface of the array board 11b. The array board-side contact 43 overlaps the CF board-side contacts 42. The array board-side contacts 43 are electrically connected to the CF board-side contacts 42. The array board-side contacts 43 are connected to the driver 16 via connecting lines, which are not illustrated, formed on the inner surface of the array board 11b. The drive signals Vdri from the touch controller 48 in the control circuit board 18 are sequentially transmitted to the drive electrodes 39 via the flexible circuit board 17, the driver 16, the array board-side contacts 43, the CF board-side contacts 42, and the position detection lines 40. The CF board-side contacts 42 and the array board-side contacts 43 overlap the seating member (not illustrated) for sealing the liquid crystal layer 11c in the plan view and are electrically connected to each other via conductive grains that are contained in the sealing member.

Figure 9:
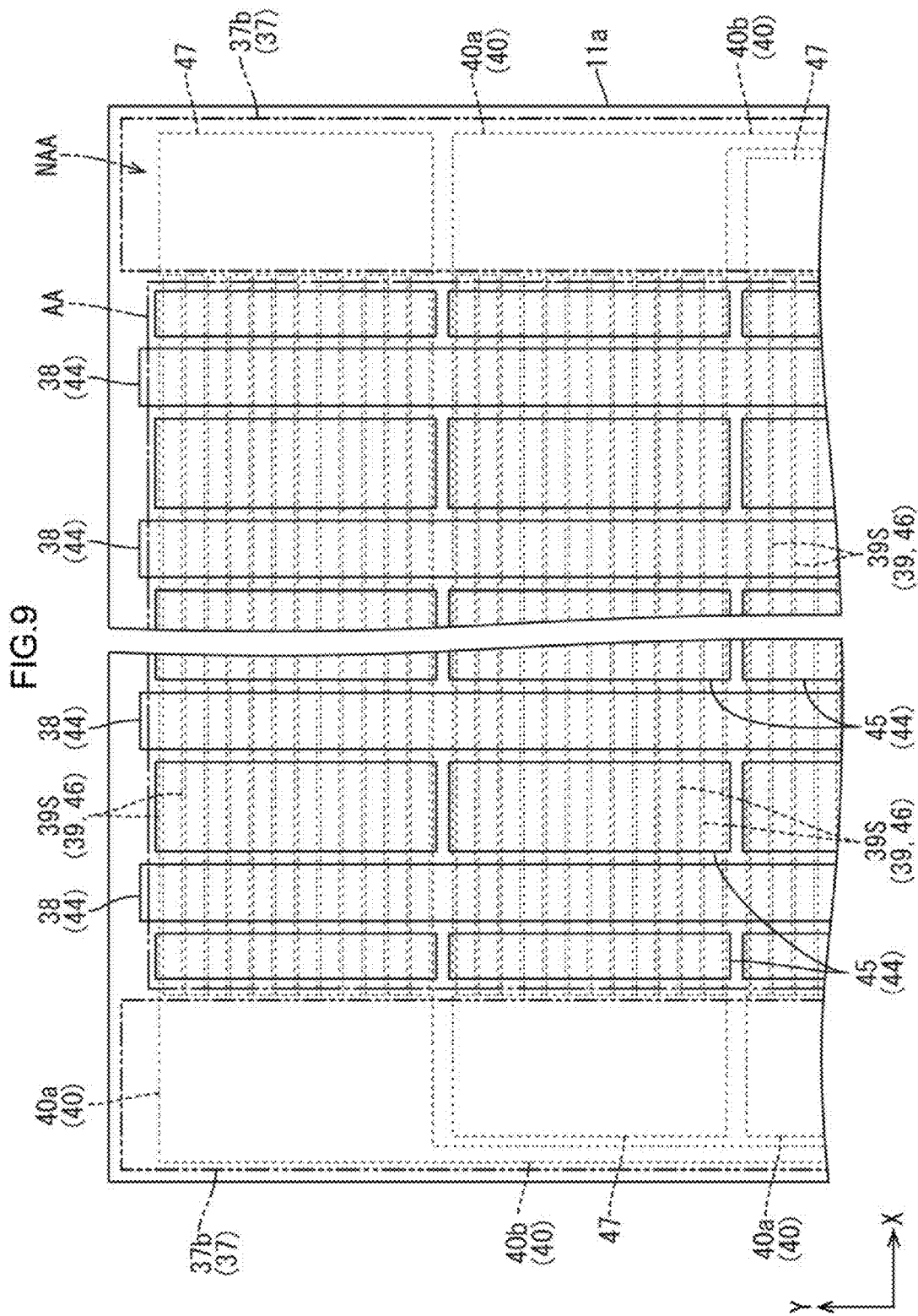
FIG. 9 is a magnified plan view of end portions of the CF board with respect to a short-side direction.

As illustrated in FIGS. 4 and 9, each of the detection electrodes 38 is formed on the outer surface of the CF board 11a to extend along the long-side direction of the display area AA, that is, the Y-axis direction (a first direction, the scanning direction). The detection electrode 38 has a vertically-long rectangular two-dimensional shape. The detection electrodes 38 are formed from a transparent electrode film 44 that is made of transparent electrode material such as indium tin oxide (ITO) and zinc oxide (ZnO) similar to the pixel electrodes 20 and the common electrodes 23. Therefore, the detection electrodes 38 are less likely to be recognized by the user although the detection electrodes 38 are arranged in the area of the CF board 11a in the display area AA. Each detection electrode 38 has a length larger than a length of a floating electrode 45, which will be described later, and further larger than a length of the display area AA. An end of the detection electrode 38 (on the lower side in FIG. 4) reaches the non-display area NAA. The end of the detection electrode 38 is connected to the touchscreen flexible circuit board 41. The detection electrode 38 has a width larger than a dimension of the display pixel (the pixel portion PX) with respect to the X-axis direction and thus the detection electrode 38 crosses multiple display pixels (pixel portions PX) (see FIG. 7). Specifically, the width of the detection electrode 38 is about some mm, that is, significantly larger than the dimension of the display pixel (the pixel portion PX) with respect to the X-axis direction, which is about some hundreds μm.

As illustrated in FIGS. 4 and 9, the detection electrodes 38 (twelve of them in IFG. 4) are arranged at intervals with respect to the short-side direction, that is, the X-axis direction (the second direction, a direction perpendicular to the scanning direction) on the outer surface of the CF board 11a in the display area AA. The intervals of the detection electrodes 38 arranged with respect to the X-axis direction are equal to each other, that is, the detection electrodes 38 are arranged at equal intervals. Floating electrodes 45 are arranged adjacent to the detection electrodes 38, respectively, with respect to the X-axis direction in a plan view on the outer surface of the CF board 11a in the display area AA. Some of the floating electrodes 45 are arranged between the detection electrodes 38 that are adjacent to each other with respect to the X-axis direction. Other floating electrodes 45 are closer to the edges than the outermost detection electrodes 38 with respect to the X-axis direction. The floating electrodes 45 are physically and electrically separated from the detection electrodes 38 such that the floating electrodes 45 form an islands pattern. The floating electrodes 45 form capacitances at least with the detection electrodes 38 adjacent to the X-axis direction. The floating electrodes 45 that are sandwiched between the detection electrodes 38 adjacent to each other with respect to the X-axis direction form the capacitances with the detection electrodes 38 on the right and the left of the floating electrodes 45 with respect to the X-axis direction. The floating electrodes 45 on the outermost with respect to the X-axis direction form the capacitances with the detection electrodes 38 at the outermost with respect to the X-axis direction. The floating electrodes 45 are formed from the transparent electrode film 44 that forms the detection electrodes 38 in the same layer as the detection electrodes 38 on the outer surface of the CF board 11a. To form the floating electrodes 45 and the detection electrodes 38, the transparent electrode film 44 in the solid pattern on the outer surface of the CF board 11a and patterned. Through the process, the floating electrodes 45 and the detection electrodes 38 that are electrically independent from each other are formed. With the floating electrodes 38, the light transmissivity in areas between the detection electrodes 38 adjacent to each other with respect to the X-axis direction is about equal to the light transmissivity in the areas in which the detection electrodes 38 are arranged. Therefore, the detection electrodes 38 are less likely to be recognized by the user.

As illustrated in FIG. 9, the floating electrodes 45 adjacent to the detection electrodes 38 with respect to the X-axis direction are segmented into segment floating electrodes 45S with respect to the Y-axis direction to overlap the drive electrodes 39, respectively. Each of the segment floating electrodes 45S has a vertically-long rectangular two-dimensional shape. A long dimension of each segment floating electrode 45S (a dimension in the Y-axis direction) is smaller than the long dimension of each detection electrode 38 and about equal to a width of the drive electrode 39 (a dimension in the Y-axis direction), which will be described later. The segment floating electrodes 45S are arranged to overlap the drive electrodes 39 arranged along the Y-axis direction in the plan view. According to the configuration, the segment floating electrodes 45S form the capacitance with the overlapping drive electrodes 39, respectively. Therefore, the segment floating electrodes 45S are less likely to be affected by the potentials of the drive electrodes 39 other than the overlapping drive electrodes 39. The number of segment floating electrodes 45S of each floating electrode 45 (the number of segmentations of the floating electrode 45) is equal to the number of drive electrodes 39 that are arranged along the Y-axis direction.

Figure 10:
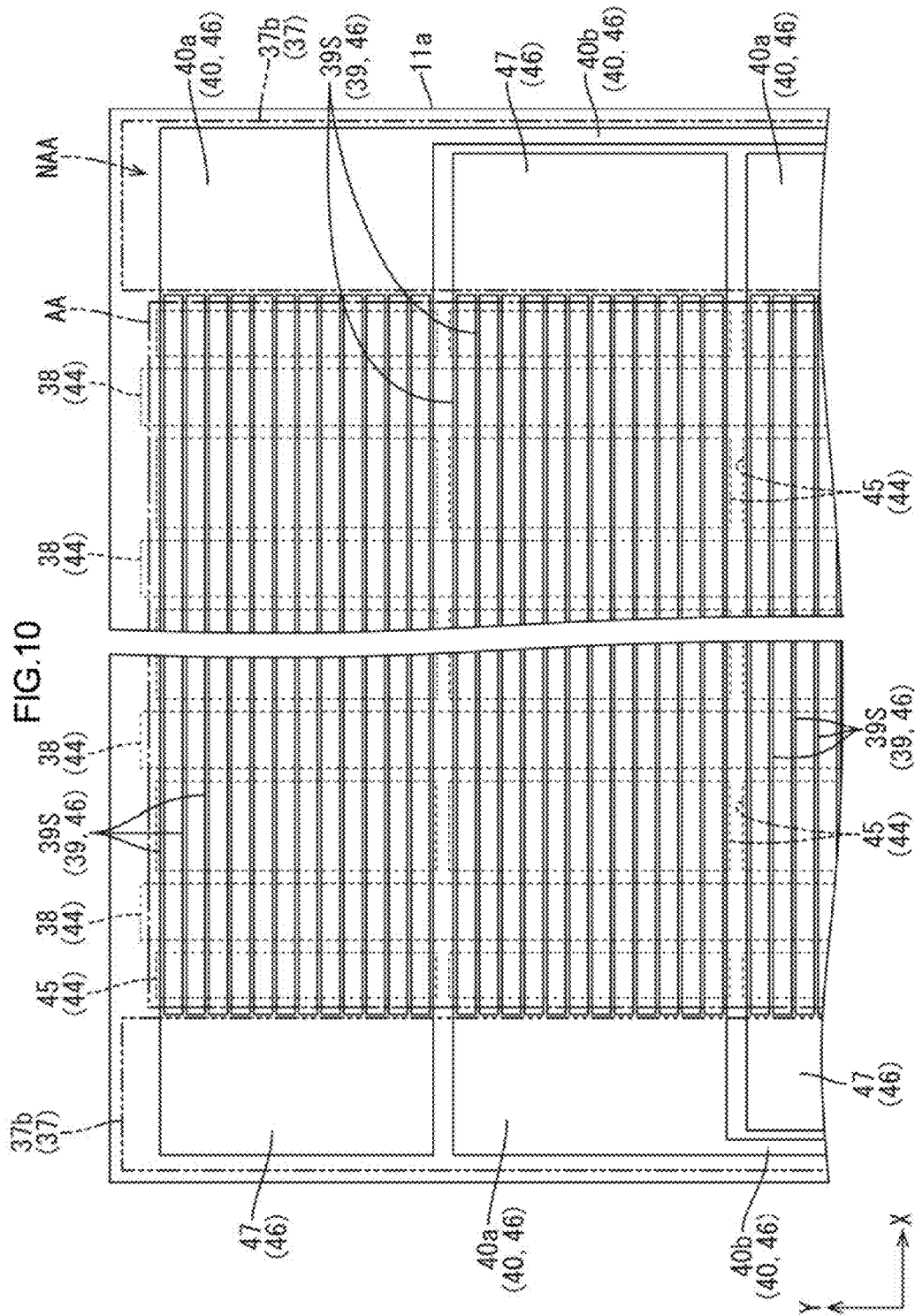
FIG. 10 is a magnified bottom view of end portions of the CF board with respect to the short-side direction at an end opposite from a terminal portion side with respect to a long-side direction.

As illustrated in FIGS. 5 and 10, the drive electrodes 39 extend along the X-axis direction (the second direction) perpendicular to the Y-axis direction (the first direction, the extending direction of the detection electrodes) in which the detection electrodes 38 extend within the inner surface of the CF board 11a in the display area AA. Each drive electrode 39 has a length about equal to the short dimension of the display area AA and a width larger than the width of the detection electrode 38. The drive electrodes 39 are arranged along the Y-axis direction perpendicular to the extending direction of the drive electrodes 39 within the inner surface of the CF board 11a in the display area AA. Intervals of the drive electrodes 39 with respect to the Y-axis direction are equal to each other. Namely, the drive electrodes 39 are arranged at equal intervals. Portions of the drive electrodes 39 cross the detection electrodes 38 and the floating electrodes 45 in the plan view. The portions of the drive electrodes 39 and portions of the detection electrodes 38 and the floating electrodes 45 are opposed to each other with the glass substrate GS of the CF board 11*a* therebetween. The capacitances are formed between the portions of the drive electrodes 39 and portions of the detection electrodes 38 and the floating electrodes 45. The drive electrodes 39 are formed from a metal film 46 having the conductivity higher than the transparent electrode film 44 that forms the detection electrodes 38 and the floating electrodes 45 and thus the wire resistances are reduced. The metal film 46 that forms the drive electrodes 39 is made of metal material such as aluminum, molybdenum, titanium, tungsten, copper, silver, and gold. The metal film 46 that forms the drive electrode 39 forms CF board-side contacts 42.

Figure 8:
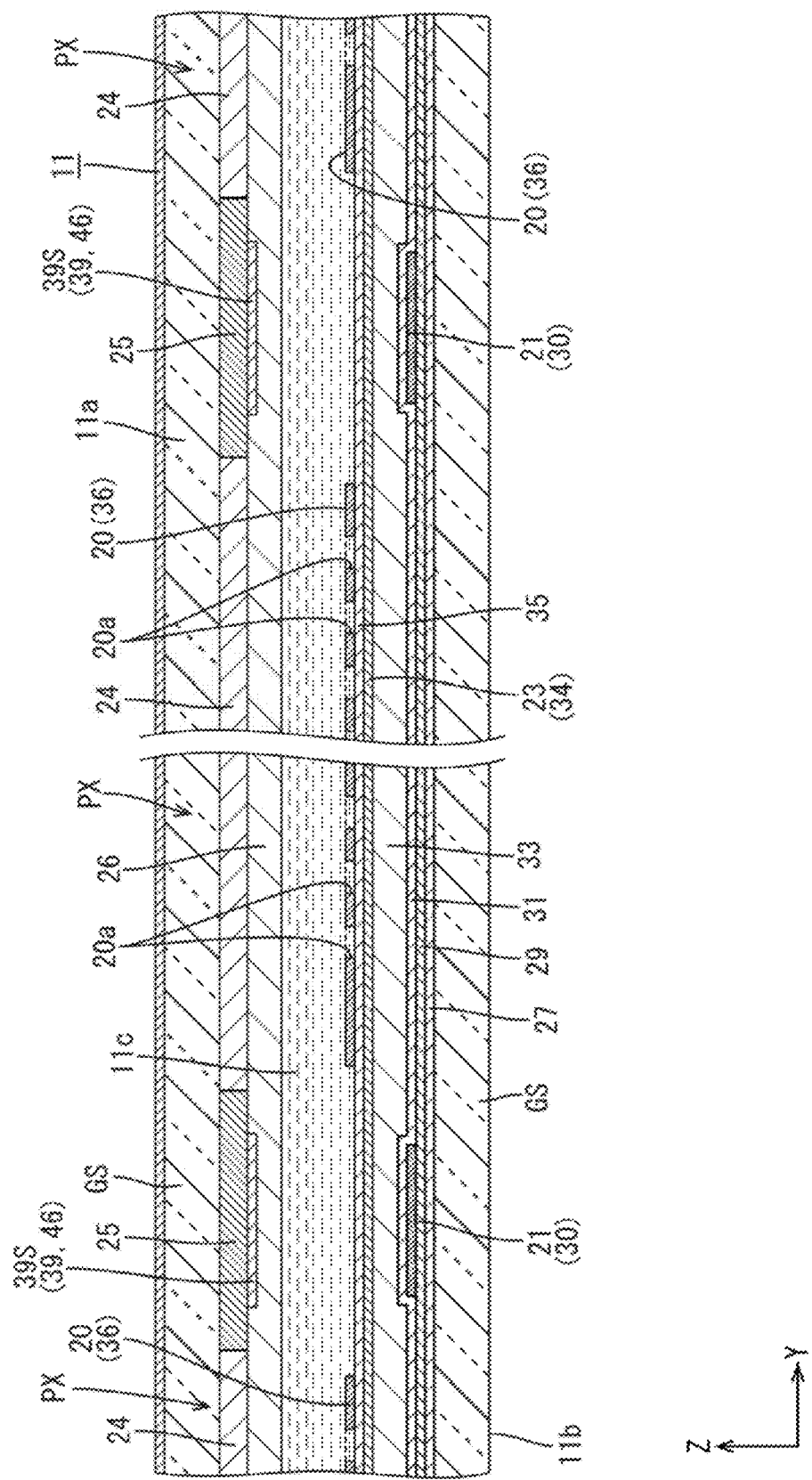
FIG. 8 is a cross-sectional view along line viii-viii in FIG. 6.
Figure 12:
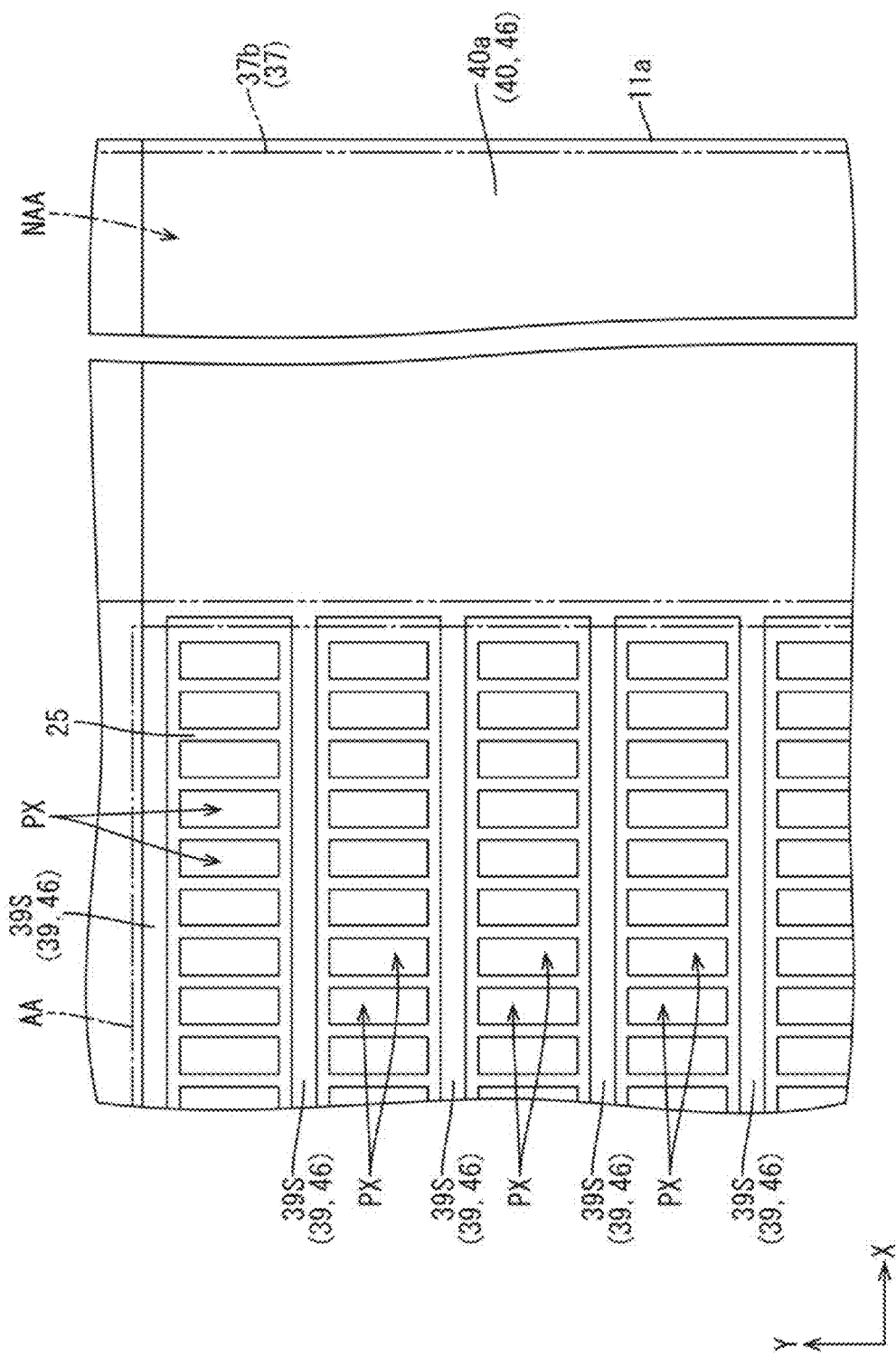
FIG. 12 is a further magnified bottom view of the end portions of the CF board with respect to the short-side direction at the end opposite from the terminal portion side with respect to the long-side direction.

The metal film 46 that forms the drive electrode 39 has high conductivity but very low light transmissivity. Therefore, the drive electrodes 39 of the CF board 11*a* in the display area AA may be recognized by the user. As illustrated in FIGS. 8 and 12, the drive electrodes 39 are segmented into segment drive electrodes 39S (segment second position detection electrodes, unit drive electrodes, branch drive electrodes). The segment drive electrodes 39S are arranged to overlap portions of the light blocking portion 25 of the CF board 11*a* in the plan view. The segment drive electrodes 39S of the drive electrodes 39 extend along the X-axis direction (the second direction). The segment drive electrodes 39S are arranged over portions of the light blocking portion 25 which extend along the X-axis direction (on the array board 11*b* side, the liquid crystal layer 11*c* side, a side opposite from the glass substrate GS side). Because the drive electrodes 39 are hidden from the user with the light blocking portion 25, ambient light is less likely to be reflected by the drive electrodes 39 and the drive electrodes 39 are less likely to be recognized by the user. The segment drive electrodes 39S are arranged at intervals with respect to the Y-axis direction. The intervals are about equal to the intervals of the gate lines 21 arranged in the Y-axis direction (the intervals of the pixel portions PX with respect to the Y-axis direction, the length of the pixel electrodes 20). The segment drive electrodes 39S are arrange to overlap the gate lines 21 in the plan view. The segment drive electrodes 29S of the drive electrodes 39 has the width slightly smaller than the width of the portions of the light blocking portion 25 which extend in the X-axis direction. Even if relative positions of the light blocking portion 25 and the drive electrodes 39S are shifted during patterning in the production process of the CF board 11*a*, the segment drive electrodes 39S and the light blocking portion 25 are more likely to overlap each other. The width of the segment drive electrodes 39S are smaller than the width of the detection electrodes 38.

As illustrated in FIGS. 5 and 10, the position detection lines 40 are routed such that a first end of each position detection line 40 is connected to one end of the drive electrode 39. A second end of the position detection line 40 is connected to the CF board-side contact 42. A large portion of the position detection line 40 extends along the Y-axis direction (the first direction) perpendicular to the extending direction of the drive electrode 39. Specifically, each position detection line 40 includes a first line portion 40*a*, a second line portion 40*b*, and a third line portion 40*c*. The first line portion 40*a* is connected to one end of the drive electrode 39. The second line portion 40*b* extends from the first line portion 40*a* along the Y-axis direction. The third line portion 40*c* has a planar shape bent to extend from the second line portion 40*b* to the CF board-side contact 42. The width of the position detection line 40 decreases in stepwise as approaching from the drive electrode 39 to the CF board-side contact 42. The width of the first line portion 40*a* is about equal to the width of the drive electrode 39 and the width of the second line portion 40*b* is smaller than the width of the first line portion 40*a*. The width of the third line portion 40*c* is smaller than the width of the second line portion 40*b*. The position detection line 40 extends from the corresponding drive electrode 39 to the CF board-side contact 42. Therefore, the position detection line 40 closer to the CF board-side contact 42 has a smaller length and the position detection line 40 farther from the CF board-side contact 42 has a larger length.

The position detection lines 40 are formed from the metal film 46 that forms the drive electrodes 39 and arranged in the same layer as the drive electrodes 39 on the inner surface of the CF board 11*a*. Because the position detection lines 40 are formed from the metal film 46, the wire resistances are sufficiently low. Therefore, the drive signals Vdri transmitted to the drive electrodes 39 are less likely to become dull. The position detection lines 40 are formed from the metal film 46 and thus less likely to have light transmissivity. However, the position detection lines 40 are arranged on the CF board 11*a* in the non-display area NAA. Therefore, the display quality is less likely to be subject to adverse effect.

As illustrated in FIGS. 5 and 10, the position detection lines 40 are arranged to sandwich the drive electrodes 39 in the direction in which the drive electrodes 39 extend. Namely, the position detection lines 40 are arranged in the non-display areas NAA (non-touch areas) on the right side and the left side of the display area AA (the touch area) with respect to the X-axis direction. The position detection lines 40 are arranged to overlap the row control circuits 37*b* on the array board 11*b* in the non-display areas NAA in the plan view. Even if noise is generated from the row control circuits 37*b*, the noise can be blocked by the multiple position detection lines 40. Therefore, the position detection performances of the touchscreen pattern TPP are less likely to decrease. On one of sides with respect to the direction in which the drive electrodes 39 extend, the position detection lines 40 that overlap one of the row control circuits 37*b* (e.g., one on the right in FIG. 5) are connected to first ends of the drive electrodes 39. On the other one of sides with respect to the direction in which the drive electrodes 39 extend, the position detection lines 40 that overlap the other one of the row control circuits 37*b* (e.g., one on the left in FIG. 5) are connected to the second ends of the drive electrodes 39. The drive electrodes 39, the first ends of which are connected to one of the position detection lines 40, and drive electrodes 39, the second ends of which are connected to the other of the position detection lines 40, are alternately arranged along the Y-axis direction. More specifically, the drive electrodes 39 in odd lines from the CF board-side contact 42 with respect to the Y-axis direction are connected to the position detection lines 40 on the other one of sides and the drive electrodes 39 in even lines are connected to the position detection lines 40 on one of sides.

As illustrated in FIGS. 5 and 10, on the inner surface of the CF board 11*a* in the non-display area NAA, dummy lines 47 are formed adjacent to the ends of the drive electrodes 39 to which the position detection lines 40 are not connected with respect to the X-axis direction. Each of the dummy lines 47 has a dimension in the Y-axis direction about equal to the width of the drive electrode 39 (a dimension in the Y-axis direction). The dummy lines 47 are provided for the drive electrodes 39 arranged along the X-axis direction, respectively. Specifically, some of the dummy lines 47 are arranged adjacent to the second ends of the drive electrodes 39 connected to the position detection lines 40 on one of the sides and other dummy lines 47 are arranged adjacent to the first ends of the drive electrodes 39 connected to the position detection lines 40 on the other one of the sides. Each dummy line 47 is arranged in an area defined by the drive electrodes 39 adjacent with respect to the X-axis direction and the second line portion 40b of the position detection line 40 adjacent to the dummy line 47 farther from the CF board-side contact 42 with respect to the Y-axis direction. The dummy line 47 has a dimension in the X-axis direction is smaller than a distance between the drive electrode 39 and the second line portion 40b that sandwich the dummy line 47. In comparison between the dummy line 47 closer to the CF board-side contact 42 and dummy line 47 farther from the CF board-side contact 42 with respect to the Y-axis direction, the dimension of the dummy line 47 closer to the CF board-side contact 42 in the X-axis direction is smaller than the dimension of the dummy line 47 farther from the CF board-side contact 42. The dummy lines 47 are formed from the metal film 46 that forms the drive electrodes 39 and the position detection lines 40 in the same layer on the inner surface of the CF board 11a in which the drive electrodes 39 and the position detection lines 40 are formed. It is preferable to set a distance between the dummy line 47 and the adjacent line portion 40b in a range from 3μm to 100μm.

The dummy lines 47 are arranged to overlap the row control circuits 37b on the array board 11b in the non-display areas NAA in the plan view. Specifically, the dummy lines 47 adjacent to the first ends of the drive electrodes 39 and connected to the second ends of the position detection lines 40 overlap one of the row control circuits 37b and the dummy lines 47 adjacent to the second ends of the drive electrodes 39 connected to the first ends of the position detection lines 40 overlap the other one of the row control circuits 37b in the plan view. The dummy lines 47 (except for the farthest one from the CF board-side contact 42) are arranged to fill gaps between ends of the drive electrodes 39 opposite from the ends connected to the position detection lines 40 and the second line portions 40b of the position detection lines 40 adjacent thereto with respect to the X-axis direction. The dummy lines 47 are connected to the ends of the adjacent drive electrodes 39 with respect to the X-axis direction, that is, the ends of the drive electrodes 39 which are not connected to the position detection lines 40. Even if noise is produced from the row control circuits 37b, the position detection lines 40 and the dummy lines 47 block the noise with high efficiency. In the production process, the metal film 46 that forms the drive electrodes 39, the position detection lines 40, the CF board-side contacts 42, and the dummy lines 47 is formed on the inner surface of the CF board 11a and patterned. Then, continuity inspection pads included in a continuity inspection apparatus may be applied to the CF board-side contacts 42 and the dummy lines 47 to pass currents and determine whether or not defectives such as broken lines are present in the drive electrodes 39 and the position detection lines 40. Namely, the dummy lines 47 can be used for the continuity inspection for the drive electrodes 39 and the position detection lines 40. The dummy lines 47 do not contribute to the position inputting function.

Figure 11:
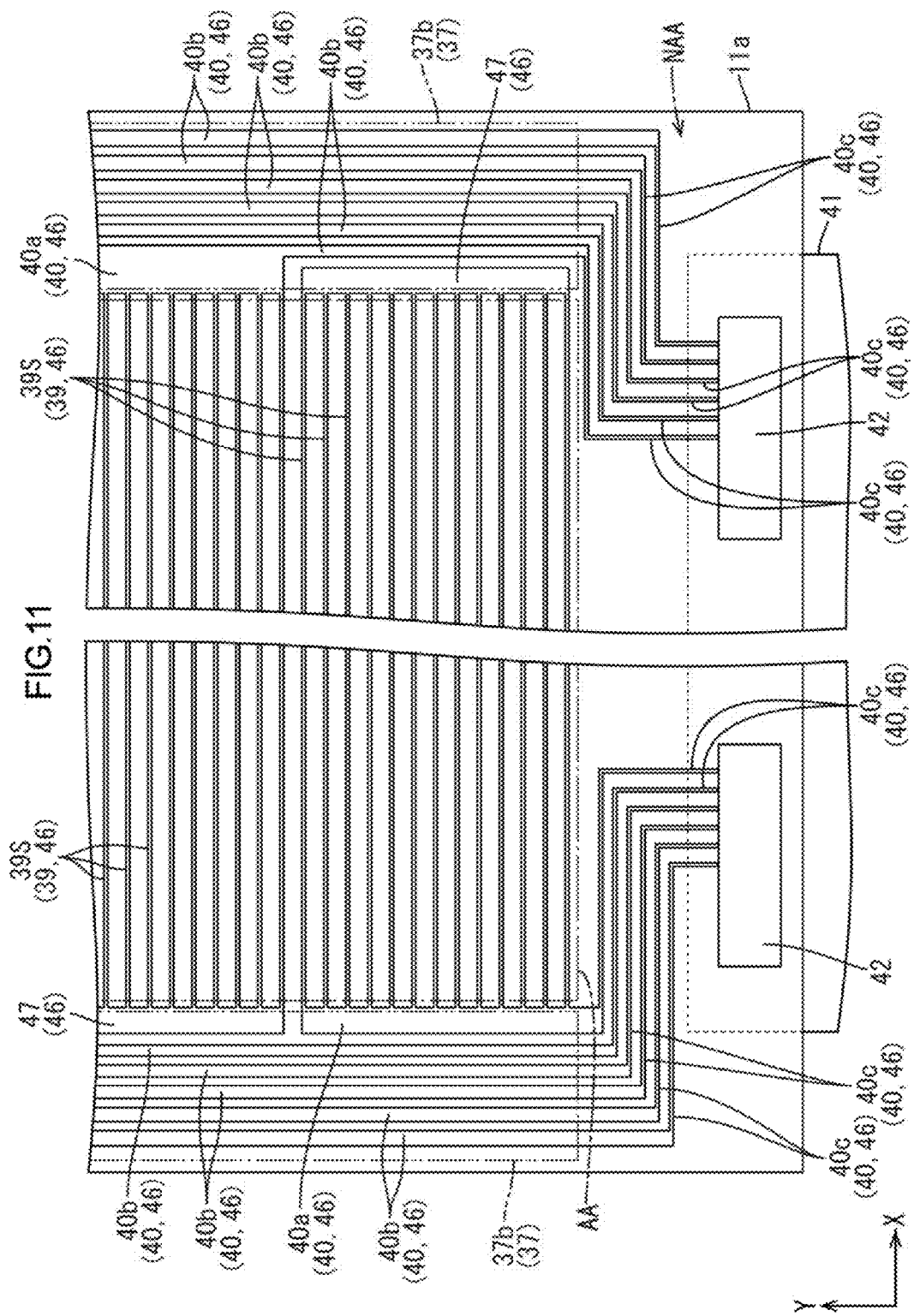
FIG. 11 is a magnified bottom view of end portions of the CF board with respect to the short-side direction at an end on the terminal portion side with respect to the long-side direction.

As illustrated in FIGS. 10 and 11, the widths of the second line portions 40b of the position detection lines 40 are different from one another according to the drive electrodes 39 to which the position detection lines 40 are connected. Specifically, the widths of the first line portions 40a and the third line portions 40c of the position detection lines 40 are substantially constant regardless of the drive electrodes 39 to which the position detection lines 40 are connected. The widths of the second line portions 40b connected to the drive electrodes 39 closer to the CF board-side contacts 42 are smaller and the widths of the second line portions 40b that are connected to the drive electrodes 39 that are farther from the CF board-side contacts 42 are larger. The lengths of the position detection lines 40 that are connected to the drive electrodes 39 that are farther from the CF board-side contacts 42 are longer than the lengths of the position detection lines 40 that are connected to the drive electrodes 39 that are closer to the CF board-side contacts 42. Therefore, the wire resistances tend to be higher. By setting the widths of the second line portions 40b larger as described above, the line resistances can be reduced. According to the configuration, differences in wire resistance between the position detection lines 40 that are connected to the drive electrodes 39 that are farther from the CF board-side contacts 42 and the position detection lines 40 that are connected to the drive electrodes 39 that are closer to the CF board-side contacts 42 can be reduced. Therefore, the position detection performances are less likely to be reduced. The dimensions of the first line portions 40a of the position detection lines 40 in the Y-axis direction (widths) are substantially constant. The X-dimensions of the first line portions 40a that are connected to the drive electrodes 39 that are closer to the CF board-side contacts 42 are smaller.

Next, various films formed in layers on the inner surface of the CF board 11a (on the liquid crystal layer 11c side, on the opposed surface side to the array board 11b) by a known photolithography method will be described. As illustrated in FIGS. 7 and 8, the CF board 11a includes a layer of the light blocking portion 25 and the color filters 24, the metal film 46, and the planarization film 26 formed in layers in this sequence from the lower side (from the glass substrate, on the front side). Although not illustrated, the alignment film is formed over the planarization film 26. In this embodiment, although not illustrated, photo spacers having a columnar shape on the planarization film 26 on the upper layer side. The photo spacers protrude toward the array board 11b to penetrate through the liquid crystal layer 11c. The photo spacers are for maintaining a cell gap in mainly in the display area AA at constant.

Figure 14:
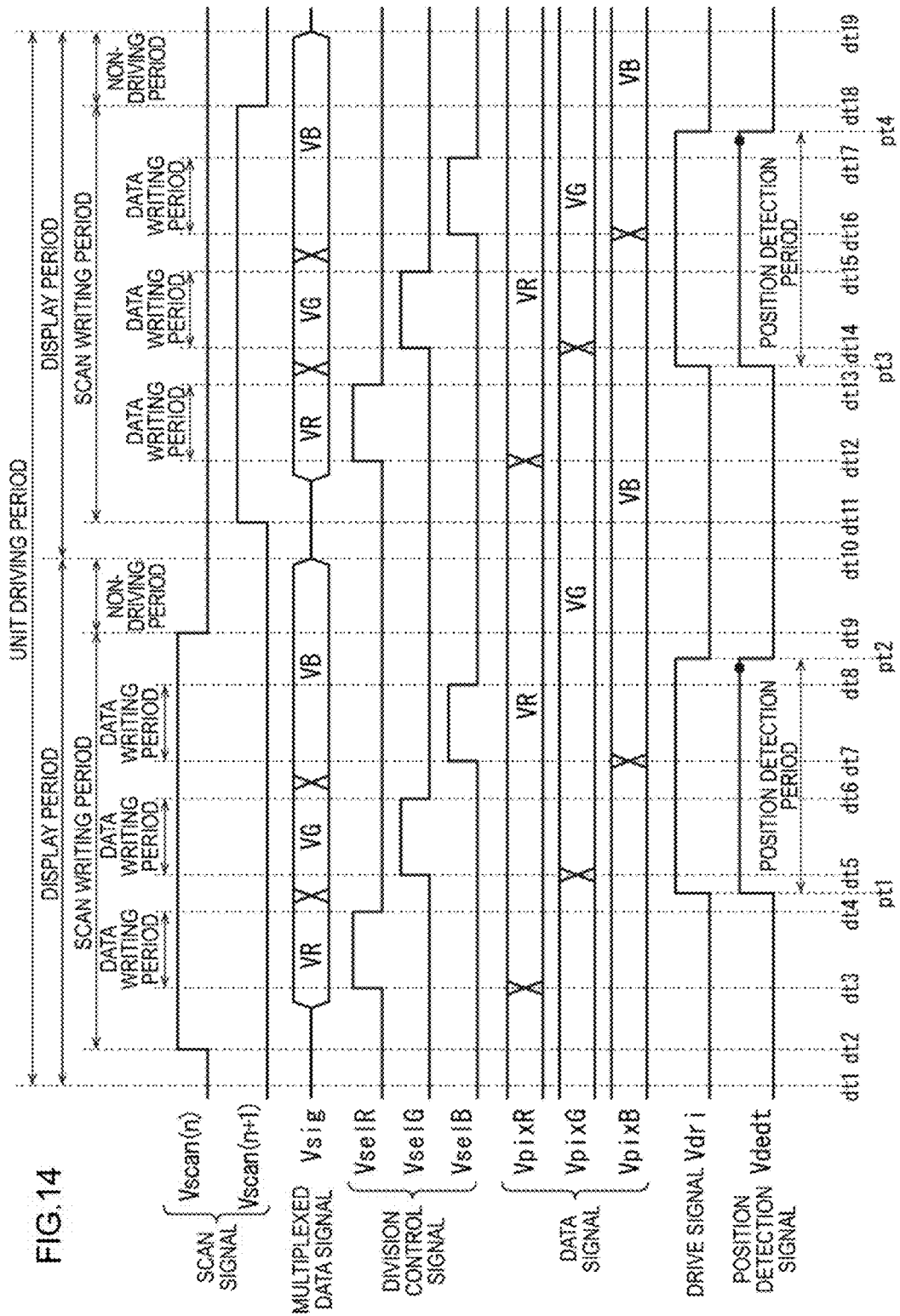
FIG. 14 is a timing chart illustrating the control of display and the control of position detection in the liquid crystal display device.

As illustrated in FIGS. 7 and 8, the light blocking portion 25 is formed on the front surface of the glass substrate GS of the CF board 11a across the display area AA and the non-display area NAA. The light blocking portion 25 may be made of photosensitive resin with a light blocking material (e.g., carbon black) added thereto and thus have high light blocking properties. An area of the light blocking portion 25 in the display area AA is patterned in a grid in the plan view. An area of the light blocking portion 25 in the non-display area NAA is patterned in a frame form in the plan view. The pattern of the light blocking portion 25 in the display area AA is formed with traces that extend along the Y-axis direction and traces that extend along the X-axis direction connected to one another. As illustrated in FIG. 12, the traces define the pixel portions PX. Specifically, the traces of the light blocking portion 25 extending along the Y-axis direction are arranged at intervals to correspond to the short dimensions of the pixel portions PX in the X-axis direction (intervals with respect to the X-axis direction) in the display area AA. The traces of the light blocking portion 25 along the X-axis direction are arranged at intervals to correspond to the long dimensions of the pixel portions PX in the Y-axis direction (intervals with respect to the Y-axis direction) in the display area AA. As illustrated in FIGS. 7 and 8, the color filters 24 are arranged in the display area AA and formed in the island pattern that corresponds to the arrangement of the pixel electrodes 20 on the array board 11b, which will be described later. The color filters 24 may be made of photosensitive resin with pigments for coloring. Specifically, the color filters 24 include a large number of color portions that are two-dimensionally arranged in a matrix on the CF board 11a at positions to overlap the pixel electrodes 20 on the array board 11b in the plan view in the display area AA. Each of the color portions has a vertically-long rectangular in the plan view (not illustrated). The color filters 24 includes lines of the color potions that represent red, green, and blue, respectively, repeatedly arranged along the row direction (the X-axis direction). The lines of the color portions are arranged along the column direction (the Y-axis direction). In the display area AA, the adjacent color portions are separated from each other with the traces of the light blocking portion 25 for reducing color mixture between the pixel portions PX. The metal film 46 is formed above the light blocking portion 25. The metal film 46 is formed in a stripe pattern that overlaps the traces of the light blocking portion 25 along the X-axis direction in the display area AA to form the drive electrodes 39 (FIG. 14). Portions of the metal film 46 arranged in the non-display area NAA form the position detection lines 40, the CF board-side contacts 42, and the dummy lines 47. The planarization film 26 is formed over the light blocking portion 25, the color filters 24, and the metal film 46 and in a solid pattern across the display area AA and the non-display area NAA. The planarization film 26 may be made of acrylic resin such as polymethylmethacrylate resin (PMMA). The planarization film 26 has a thickness larger than the thicknesses of the color filters 24, the light blocking portion 25, and the metal film 46. The surface of the CF board 11a on the liquid crystal layer 11c side (on which the alignment film is formed) is properly planarized. The planarization film 26 covers the drive electrodes 39, the position detection lines 40, and the dummy lines 47 that are formed from the metal film 46 from the array board 11b side.

Figure 13:
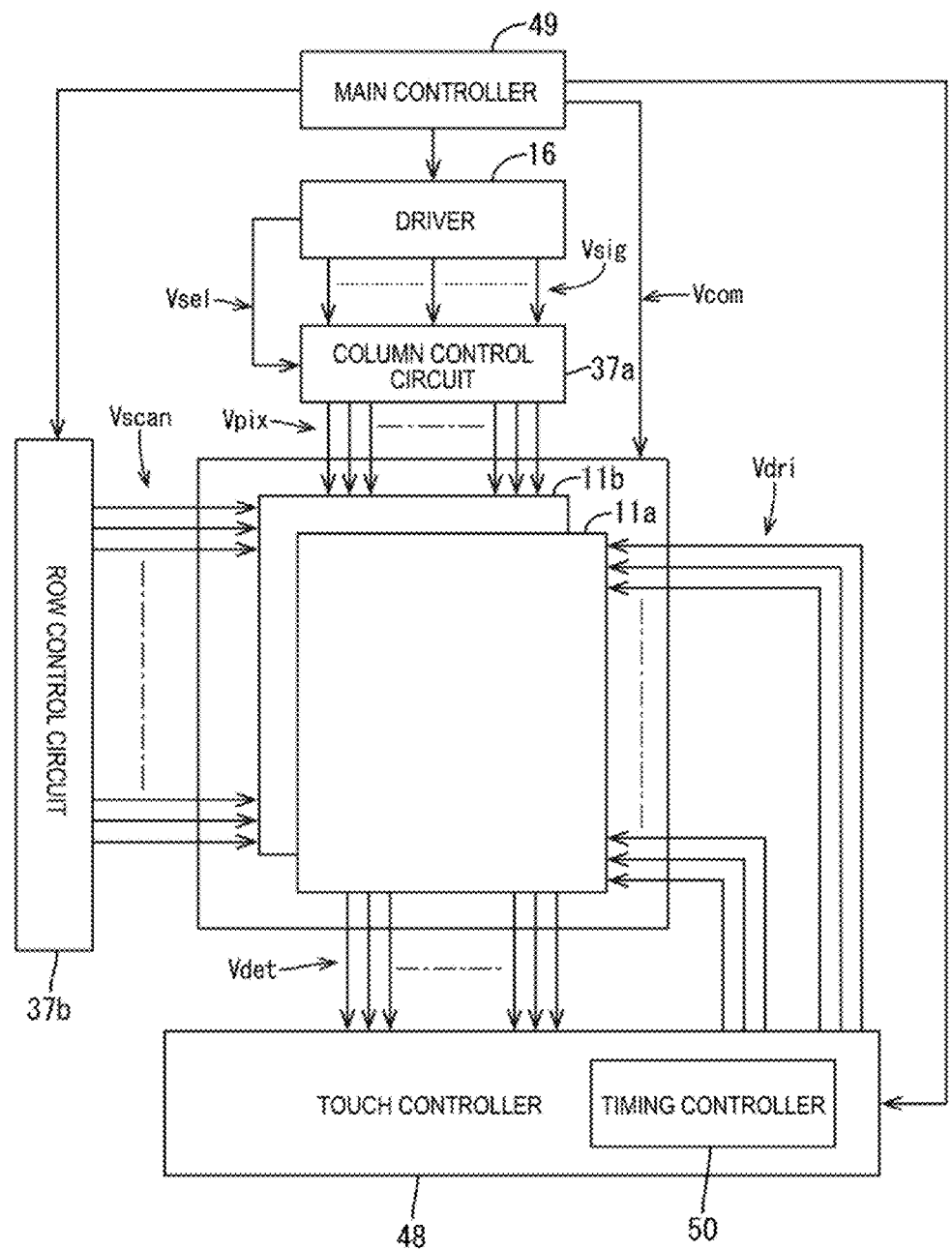
FIG. 13 is a block diagram illustrating control of display and control of position detection in the liquid crystal display device.

Next, display control and position detection control in the liquid crystal display device 10 will be described in detail with reference to FIGS. 13 and 14. FIG. 13 is a block diagram that illustrates the display control and the position detection control in the liquid crystal display device 10. FIG. 14 is a timing chart that illustrates the display control and the position detection control in the liquid crystal display device 10. As illustrated in FIG. 13, a configuration of the liquid crystal display device 10 for the display control and the position detection control includes a main controller 49, the driver 16, the column control circuit 37a, the row control circuit 37b, and the touch controller 48. The main controller 49 is for the display control and the position detection control. The driver 16 if for generating multiplexed data signals Vsig and division control signals Vsel based on image signals and control signals supplied by the main controller 49. The column control circuit 37a is for generating data signals Vpix linked to the respective colors of the pixel portions PX based on the multiplexed data signals Vsig and the division control signals Vsel supplied by the driver 16 and distributing the data signals Vsig to the respective source lines 22 in sequence. The row control circuit 37b is for generating the scan signals Vscan based on the control signals supplied by the main controller 49 and distributing the scan signals Vscan to the respective gate lines 21 in sequence to scan the gate lines 21. The touch controller 48 is for supplying the drive signals Vdri to the drive electrodes 39 in the touchscreen pattern TPP based on the control signals that are output by the main controller 49 to drive the drive electrodes 39. Furthermore, the touch controller 48 is for detecting the position detection signals Vdet that are output by the detection electrodes 38. The main controller 49 and the touch controller 48 are included in the control circuit board 18 and connected to the liquid crystal panel 11 via the flexible circuit board 17 and the touchscreen flexible circuit board 41. The driver 16, the column control circuit 37a, and the row control circuit 37b are included in the liquid crystal panel 11, as described earlier. The touch controller 48 includes a timing controller 50 for controlling timing for supplying the driving signals Vdri to the drive electrodes 39 to drive the drive electrodes 39 and timing for detecting the position detection signals Vdet that are output by the detection electrodes 38. The main controller 49 is for supplying the common potential signals Vcom (reference potential signals) to the common electrodes 23 of the array board 11b.

Next, the display control in the liquid crystal display device 10 will be described in detail. As illustrated in FIG. 14, the main controller 49 is configured to perform the display control so that a period for driving the collectively selected pixel portions PX in one row along the X-axis direction is defined as one display period and two display periods form a unit driving period (from timing dt1 to timing dt19). Specifically, the row control circuit 37b controlled by the main controller 49 performs control so that one unit driving period includes a first display period (from timing dt1 to timing dt10) for supplying the scan signal Vscan to the nth gate line 21 (or the TFTs 19) from the scan starting end in the display area AA and a second display period (from timing dt10 to timing dt19) for supplying the scan signal Vscan to the n+1th gate line 21 next to the nth gate line 21. The row control circuit 37b performs control so that one display period includes a scan writing period (timing dt2 to timing dt9, timing da11 to timing dt18) and a non-driving period (timing dt9 to timing dt10, timing dt18 to timing dt19). In the scan writing period, a high level of the scan signal Vscan is supplied to the gate line 21 and the TFTs 19 that are connected to the gate line 21 are driven. In the non-driving period, the scan signals Vscan are not written (scan signal non-writing period).

As illustrated in FIG. 14, the main controller 49 performs the display control so that one scan writing period includes three data writing periods (timing dt3 to timing dt4, timing dt5 to timing dt6, timing dt7 to timing dt8, timing dt12 to timing dt13, timing dt14 to timing dt15, timing dt16 to timing dt17). In the data writing period, the data signal Vpix is supplied with time division to the TFTs 19 that correspond to three colors of the pixel portions PX. Specifically, the column control circuit 37a controlled by the main controller 49 divides the multiplexed data signal Vsig supplied by the driver 16 into data signals VpixR, VpixG, and VpixB of the respective colors based on the division control signals Vsel of the respective colors (VselR, VselG VselB). The column control circuit 37a divides the red data signal VpixR, the green data signal VpixG, and the blue data signal VpixB in this sequence with time and supplies the data signals VpixR, VpixG, and VpixB to the source lines 22 that are connected to pixel portions PX of the respective colors. The data signals VpixR, VpixG, and VpixB supplied to the source lines 22 are supplied to the TFTs 19 in the pixel portion PX of the respective colors in sequence. The pixel electrodes 20 connected to the TFTs 19 in the line driven based on the scan signal Vscan are selectively charged. In periods (timing dt4 to timing dt5, timing dt6 to timing dt7, timing dt8 to timing dt12, timing dt13 to timing dt14, timing dt15 to timing dt16, timing dt17 to timing dt19) between the red data writing period (timing dt3 to timing dt4 and timing dt12 to timing dt13) and the green data writing period (timing dt5 to timing dt6, timing dt14 to timing dt15) and between the green data writing period and the blue data writing period (timing dt7 to timing dt8, timing dt16 to timing dt17) are the data signals VpixR, VpixG, and VpixB are not written (data non-writing periods).

Next, the position detection control in the liquid crystal display device 10 will be described in detail. As illustrated in FIG. 14, the main controller 49 performs the position detection control to supply the drive signals Vdri at least to the drive electrode 39 and to drive the drive electrode 39 in the scan writing period that is included in the display period. Namely, the touch controller 48 that is controlled by the main controller 49 performs control so that the scan writing period chronologically overlap the position detection period (timing pt1 to timing pt2, timing pt3 to timing pt4) in which the drive signal Vdri is supplied to the drive electrode 39 and the drive electrode 39 is driven. In this embodiment, the entire position detection period chronologically overlaps a large portion of the scan writing period. According to the configuration, the position detection timing can be synchronized with timing at which noise is less likely to be produced in accordance with image display and thus high sensitivity can be achieved in the position detection. Furthermore, because the drive signal Vdri is supplied to the drive electrode 39 and the drive electrode 39 is driven in the scan writing period, even if the display period decreases as the definition of the liquid crystal panel increases (e.g., 4K resolution), sufficiently high sensitivity can be achieved in the position detection. Furthermore, although a long period may be required for position detection in a large-size liquid crystal panel 11, a sufficient position detection period can be assured according to the above configuration. In the previous technology, the position detection is performed using the common electrode for image display. Therefore, a circuit is required for switching between image display and position detection. The array board requires such a circuit in the non-display area. In this embodiment, the position detection is performed using the detection electrodes 38 provided separately from the common electrodes 23. Therefore, a circuit for switching between image display and position detection is not required. According to the configuration, the width of the non-display area NAA can be reduced. This configuration is preferable for reducing a frame size. In the position detection period, the touch controller 48 sets the level of the drive signal Vdri supplied to the drive electrode 39 to high to drive the drive electrode 39. In the period other than the position detection period (the non-position detection period), the touch controller 48 sets the level of the drive signal Vdri to low to stop the driving of the drive electrode 39.

More specifically, the touch controller 48 that is controlled by the main controller 49 performs the position detection control so that timing pt1 (timing pt3) at which the position detection period starts is between timing dt4 (timing dt13) at which the red data writing period ends and timing dt5 (timing dt14) at which the green data writing period starts and timing pt2 (timing pt4) at which the position detection period ends is between timing dt8 (timing dt17) at which the blue data writing period ends and timing dt9 (timing dt18) at which the non-writing period starts. Namely, the position detection period extends across the green data writing period and the blue data writing period (multiple data writing periods). The touch controller 48 detects the position detection signal Vdet that are output by the detection electrode 38 (touch sensing) in a period of the position detection period between timing dt8 (timing dt17) at which the blue data writing period ends and timing dt9 (timing dt18) at which the non-writing period starts, that is, a data non-writing period in which the data signal Vpix is not written after the data writing period. Specifically, the touch controller 48 detects the position detection signal Vdet that are output by the detection electrode 38 at timing before the drive signal Vdri supplied by the drive electrode 39 shifts from high to low (timing at which the high level ends). Then, the touch controller 48 calculates the detected position detection signal Vdet and extracts detection data regarding the position detection period. The touch controller 48 obtains position information input by the user from the extracted detection data and defines an input position. In FIG. 14, timing to detect the position detection signal Vdet is indicated with a bullet. In the data writing period, noise is more likely to be produced. In the data non-writing period, noise is less likely to be produced. Therefore, as described above, by detecting the position detection signal Vdet that are output by the detection electrode 38 in the data non-writing period, the position detection can be performed without being affected by the noise produced in the data writing period. According to the configuration, high sensitivity can be achieved in the position detection.

The screen of the liquid crystal panel 11 may be divided into multiple blocks with respect to the Y-axis direction such that each block has a width equal to the width of the drive electrode 39. In the multiple display periods for driving the TFTs 19 in multiple rows (e.g., 30 rows) included in each block, the touch controller 48 performs control to repeatedly supply the drive signals Vdri to the drive electrodes 39 that overlap the block.

As described above, the liquid crystal display device 10 in this embodiment (the display device with the position inputting function) includes the TFTs 19 (the display components), the pixel electrodes, the common electrodes, the array board 11*b*, the CF board 11*a* (the common board), the detection electrodes 38, the driving electrodes 39, the driver 16, the row control circuit 37*b*, and the touch controller 48 (the position detection controller). The pixel electrodes 20 are connected to the TFTs 19. The pixel electrodes 20 and the common electrodes 23 form the capacitances therebetween. The array board 11*b* includes at least the TFTs 19. The CF board 11*a* is opposed to the array board 11*b* with the gap therebetween. The detection electrodes 38 included in the CF board 11*a* extend along the direction along the plate surface of the CF board 11*a* (the Y-axis direction). The drive electrodes 39 that are included in the CF board 11*a* extend along the plate surface of the CF board 11*a* and the direction perpendicular to the extending direction of the detection electrodes 38 (the X-axis direction). The drive electrodes 39 overlap the detection electrodes 38 in the plan view. The detection electrodes 38 and the drive electrodes 39 form the capacitances therebetween. The driver 16 and the row control circuit 37*b* are included in a display driver portion for supplying the scan signals Vscan and the data signals Vpix to the TFTs 19 for display driving. The touch controller 48 is for supplying the driving signals Vdri to the drive electrodes 39 and detecting the position detection signals Vdet that are output by the detection electrodes 38 to perform the position detection control. The touch controller 48 is for supplying the drive signals Vdri to the drive electrodes 39 to drive the drive electrodes 39 in the scan writing periods in which the scan signals Vscan are supplied to the TFTs 19 through the control by the row control circuit 37*b* that is at least included in the display driver portion and the TFTs 19 are driven.

According to the configuration, the driver 16 and the row control circuit 37*b* that are included in the display driver portion supply the scan signals Vscan and the data signals Vpix to the TFTs 19 at predefined timing. As a result, the pixel electrodes 20 connected to the TFTs 19 are charged and potential differences are produced between the pixel electrodes 20 and the common electrodes 23. Therefore, images are displayed. The touch controller 48 supplies the drive signals Vdri to the drive electrodes 39 to drive the drive electrodes 39. The touch controller 48 detects the position detection signals Vdet that are output by the detection electrodes 38 to obtain the position information input by the user and to define the input position. The touch controller 48 supplies the drive signals Vdri to the drive electrodes 39 to drive the drive electrodes 39 in the scan writing period in which the scan signals Vscan are supplied to the TFTs 19 through the control by the row control circuit 37*b* that is at least a part of the display driver portion and the TFTs 19 are driven. In comparison to a configuration in which the drive signals are supplied in the period other than the scan writing period, higher flexibility is achieved in setting timing for detecting the position detection signals Vdet that are output by the detection electrodes 38. The timing for position detection can be synchronized with the timing at which the noise is less likely to be produced in accordance with the image display. Therefore, the high sensitivities can be achieved in the position detection.

The drive signals Vdri are supplied to the drive electrodes 39 to drive the drive electrodes 39 in the scan writing periods. Even if the display periods and the periods other than the scan writing periods decrease as the definition increases, the sufficiently high position detection sensitivities can be achieved. Furthermore, even if the longer period is required for the position detection as the screen size increases, a sufficient period can be assured. In the previous technology, the position detection is performed using the common electrode for image display. Therefore, a circuit is required for switching between image display and position detection. The array board 11*b* needs to include such a circuit in the non-display area. In this embodiment, the position detection is performed using the detection electrodes 38 that are provided separately from the common electrodes 23. Therefore, a circuit for switching between image display and position detection is not required. According to the configuration, the width of the non-display area can be reduced. This configuration is preferable for reducing the frame size.

The driver 16 that is included in the display driver portion outputs the multiplexed data signals Vsig. Each multiplexed data signal Vsig includes the data signals VpixR, VpixG, and VpixB supplied to the TFTs 19. The driver 16 also outputs the division control signals Vsel for dividing the multiplexed signals Vsig into the data signals VpixR, VpixG, and VpixB. The column control circuit 37*a* (the division controller) receives the multiplexed data signals Vsig and the division control signals Vsel that are output by the driver 16 that is included in the display driver portion. The column control circuit 37*a* separates the data signals VpixR, VpixG, and VpixB from the multiplexed data signals Vsig based on the division control signals Vsel and supplies to the TFTs 19 with time division. The touch controller 48 supplies the drive signals Vdri to the driving electrodes 39 across the data writing periods in which the data signals VpixR, VpixG, and VpixB are processed with time division by the column control circuit 37*a* and supplied to the TFTs 19 to drive the drive electrodes 39. The touch controller 48 detects the position detection signals Vdet that are output by the detection electrodes 38 at the timing when the data writing period ends. The column control circuit 37*a* separates the data signals VpixR, VpixG, and VpixB from the multiplexed data signals Vsig based on the multiplexed data signals Vsig and the division control signals Vsel that are output by the driver 16 that is included in the display driver portion and supplies the data signals to the TFTs 19 with time division to drive the TFTs 19. According to the configuration, the number of lines for connecting the driver 16 in the display driver portion to the column control circuit 37*a* can be reduced. In the data writing period in which the data signals Vpix are supplied to the TFTs 19 by the column control circuit 37*a*, noise is more likely to be produced. The touch controller 48 supplies the drive signals Vdri to the driving electrodes 39 across the data writing periods to drive the drive electrodes 39. The touch controller 48 detects the position detection signals Vdet that are output by the detection electrodes 38 at the timing when the data writing period ends. Therefore, the position detection can be performed without affected by the noise produced in the data writing period. According to the configuration, higher sensitivity can be achieved in the position detection.

The TFTs 19 are arranged along the plate surface of the array board 11*b* and in the matrix. The row control circuit 37*b* that is included in the display driver portion supplies the scan signals Vscan to the TFTs 19 that are arranged in the matrix to scan along the row direction in sequence and to drive the TFTs 19. The touch controller 48 supplies the scan signals Vdri to the drive electrodes 39 in each scan writing period of the scan writing periods in sequence. The TFTs 19 that are arranged in the matrix are driven with the scan signals Vscan that are supplied in sequence for scan along the row direction. In each of the scan writing periods in sequence, the drive signals Vdri are supplied to the drive electrodes 39 to drive the drive electrodes 39. Therefore, the position detection signals Vdet based on the drive signals Vdri can be repeatedly detected in every scan writing period. According to the configuration, higher sensitivity can be achieved in the position detection.

The pixel electrodes 20 and the common electrodes 23 are on the plate surface of the array board 11*b* on the CF board 11*a* side. The detection electrodes 38 are on the first plate surface of the CF board 11*a* and the drive electrodes 39 are on the second plate surface of the CF board 11*a*. This configuration is preferable for the fringe field switching (FFS) mode and the in-plane switching (IPS) mode.

<Second Embodiment>

A second embodiment of the present invention will be described with reference to FIG. 15. The second embodiment includes timing of position detection periods different from that of the first embodiment. Configurations, functions, and effects similar to those of the first embodiment will not be described.

Figure 15:
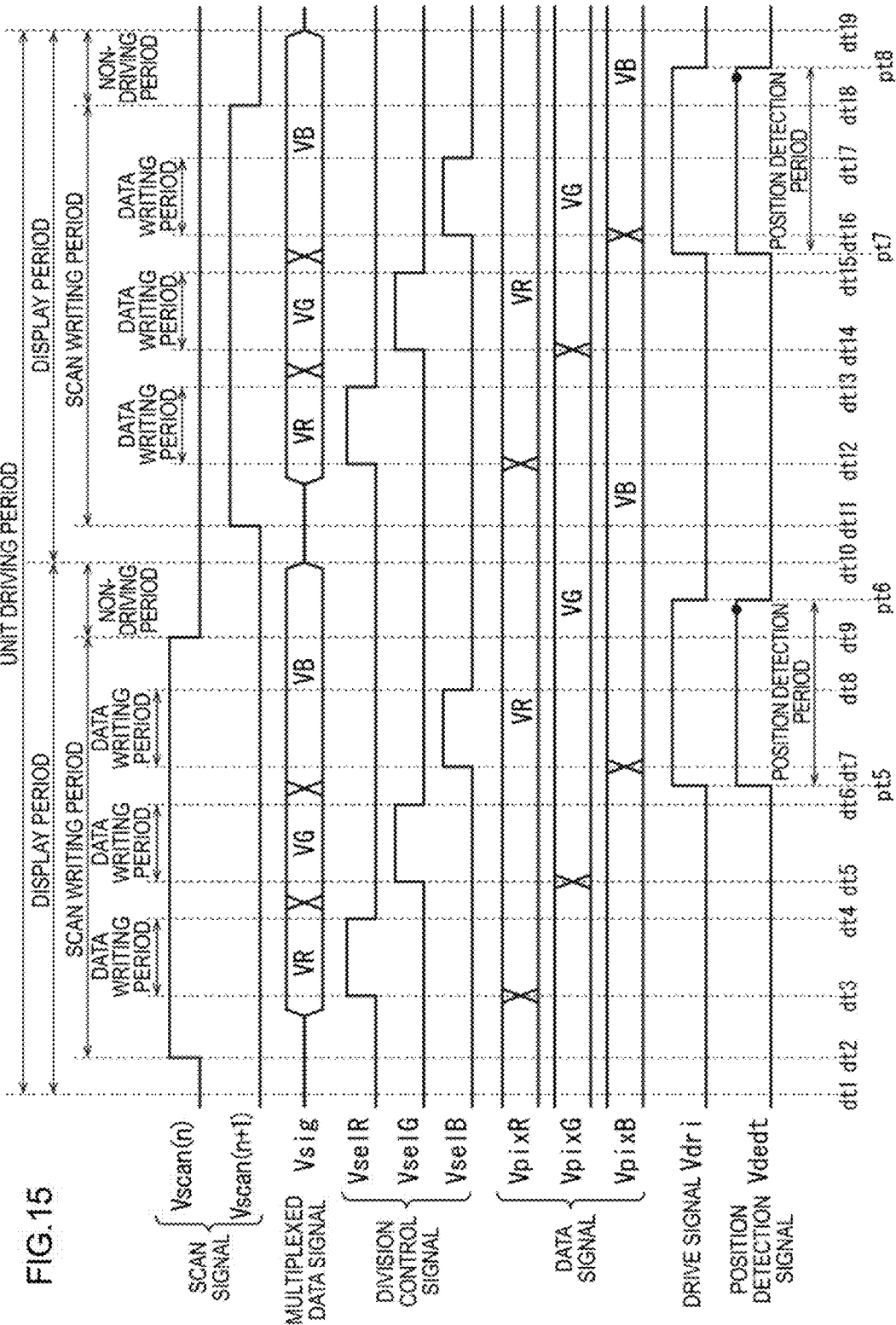
FIG. 15 is a timing chart illustrating control of display and control of position detection in a liquid crystal display device according to a second embodiment of the present invention.

As illustrated in FIG. 15, a main controller according to this embodiment controls a touch controller for supplying drive signals Vdri to the drive electrodes across scan writing periods and non-driving periods that are included in display periods to drive the drive electrodes and for detecting position detection signals Vdet that are output by the detection electrodes in the non-driving periods. Namely, the position detection periods (timing pt5 to timing pt6, timing pt7 to timing pt8) are across the scan writing periods and the non-driving periods. In the non-driving periods that are included in in the display periods, driving of the TFTs is halted. Therefore, noise is less likely to be produced. By setting the position detection periods to chronologically overlap the non-driving periods, the position detection is less likely to be affected by the noise that may be produced as the TFTs are driven. Therefore, higher sensitivity can be achieved in the position detection.

Specifically, the touch controller that is controlled by the main controller controls position detection such that timing pt5 (or timing pt7) at which the position detection period starts is between timing dt6 (or timing dt15) at which the green data writing period ends and timing dt7 (or timing dt16) at which the blue data writing period starts. Furthermore, the touch controller controls the position detection such that timing p6 (or timing pt8) at which the position detection period ends is between timing dt9 (or timing dt18) at which the non-driving period starts and timing dt10 (or timing dt19 at which the non-driving period ends. Namely, the position detection period extends from the blue data writing period, which is the last data writing period, and the non-driving period included in in the display period. The touch controller detects the position detection signals Vdet that are output by the detection electrodes in the non-driving period of the position detection period after the scan writing period, that is, a scan non-writing period in which the scan signals Vscan are not written (timing dt9 to timing dt10, timing dt18 to timing dt19).

As described above, according to this embodiment, the driver and the row control circuit in the display driver portion performs the display driving such that the display periods include the scan writing periods and the non-driving periods in which the driving of the TFTs is halted. The touch controller supplies the drive signals Vdri to the drive electrodes across the scan writing periods and the non-driving periods to drive the drive electrodes. The touch controller detects the position detection signals Vdet that are output by the detection electrodes in the non-driving periods. According to the configuration, the driving of the TFTs is halted in the non-driving periods that are included in the display periods and thus the noise is less likely to be produced. Because the touch controller supplies the drive signals Vdri to the driver electrodes across the scan writing periods and the non-driving periods to drive the drive electrodes and detects the position detection signals Vdet that are output by the detection electrodes in the non-driving periods, the position detection is less likely to be affected by the noise and thus higher sensitivity can be achieved in the position detection.

<Third Embodiment>

A third embodiment will be described with reference to FIG. 16. The third embodiment includes the number of position detection periods per one scan writing period different from that of the first embodiment. Configurations, functions, and effects similar to those of the first embodiment will not be described.

Figure 16:
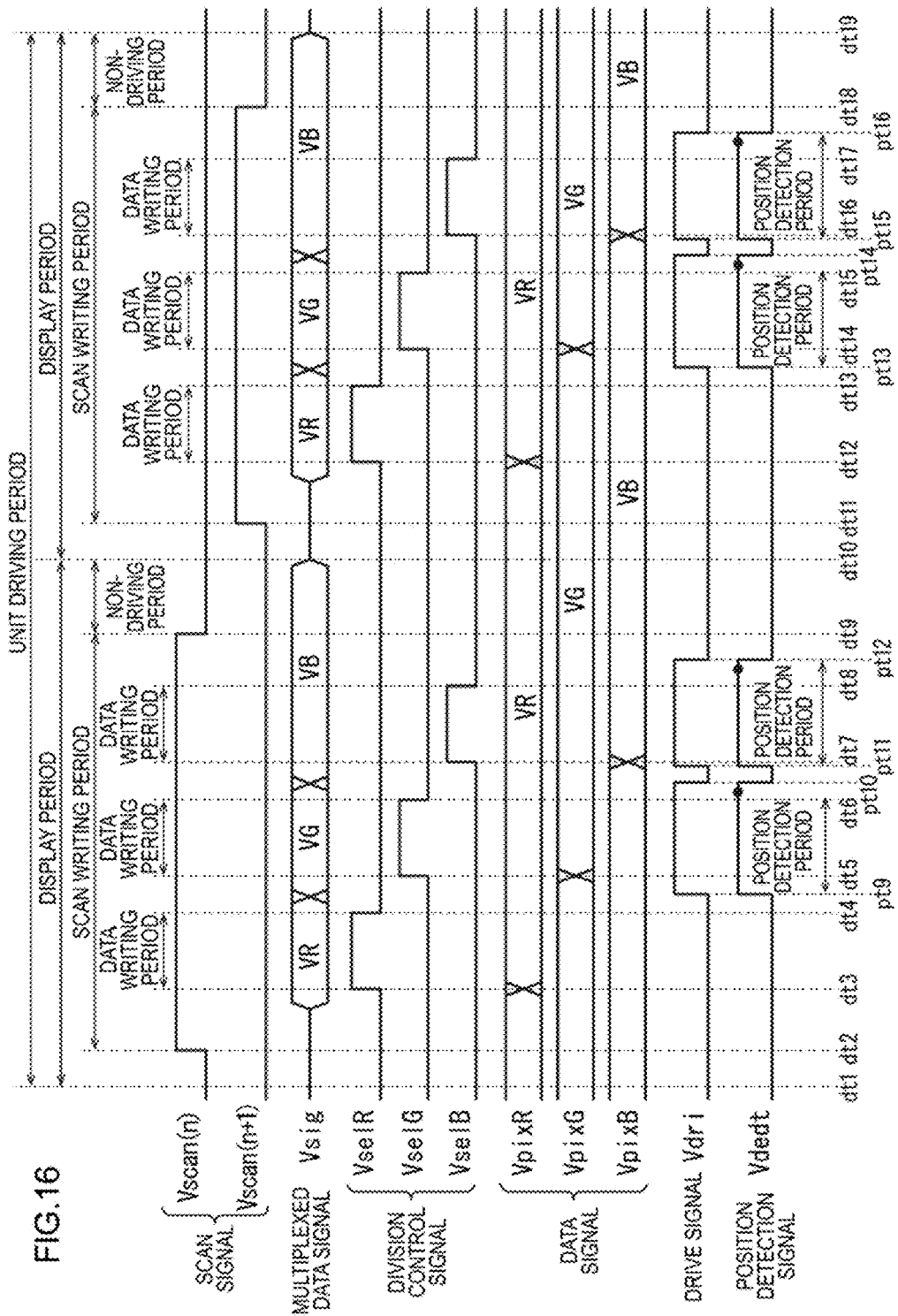
FIG. 16 is a timing chart illustrating control of display and control of position detection in a liquid crystal display device according to a third embodiment of the present invention.

As illustrated in FIG. 16, a main controller according to this embodiment controls a touch controller such that driving signals Vdri are supplied to drive electrodes twice in one scan writing period in a display period. Namely, two position detection periods (timing pt9 to timing pt10, timing pt11 to timing pt12, timing pt13 to timing pt14, timing pt15 to timing pt16) are included in each scan writing period. According to the configuration, results of the position detection can be statistically analyzed and thus a decrease in position detection sensitivity due to variations in the results of the position detection is less likely to occur.

Specifically, the touch controller that is controlled by the main controller controls the position detection such that timing pt9 (or timing pt13) at which the first position detection period starts is between timing dt4 (or timing dt13) at which the red data writing period ends and timing dt5 (or timing dt14) at which the green data writing period starts in one scan writing period. Furthermore, the touch controller controls the position detection such that timing pt10 (or timing pt14) at which the first position detection period ends is between timing dt6 (or timing dt15) at which the green data writing period ends and timing dt7 (or timing dt16) at which the blue data writing period starts. The touch controller controls the position detection such that timing pt11 (or timing pt15) at which the second position detection period starts is between timing dt6 (or timing dt15) at which the green data writing period ends and timing dt7 (or timing dt16) at which the blue data writing period starts. Furthermore, the touch controller controls the position detection such that timing p12 (or timing pt16) at which the second position detection period ends is between the timing dt8 (or timing dt17) at which the blue data writing period ends and timing dt19 (or timing dt18) at which the non-driving period starts. The touch controller detects the position detection signals Vdet that are output by the detection electrodes in the data non-writing periods (timing dt6 to timing dt7, timing dt8 to timing dt9, timing dt15 to timing dt16, timing dt17 to timing dt18) of the position detection periods in which the data signals VpixR, VpixG, and VpixB are not written after the data writing periods.

As described above, according to this embodiment, the touch controller supplies the drive signals Vdri to the drive electrodes multiple times in one scan writing period to drive the drive electrodes. According to the configuration, the position detection is performed multiple times in one scan writing period and thus results of the position detection can be statistically analyzed. Therefore, a reduction in position detection sensitivity due to variations in results of the position detection is less likely to occur.

<Fourth Embodiment>

A fourth embodiment will be described with reference to FIG. 17. The fourth embodiment includes the number of position detection periods in one unit driving period different from that of the first embodiment. Configurations, functions, and effects similar to those of the second embodiment or the first embodiment will not be described.

Figure 17:
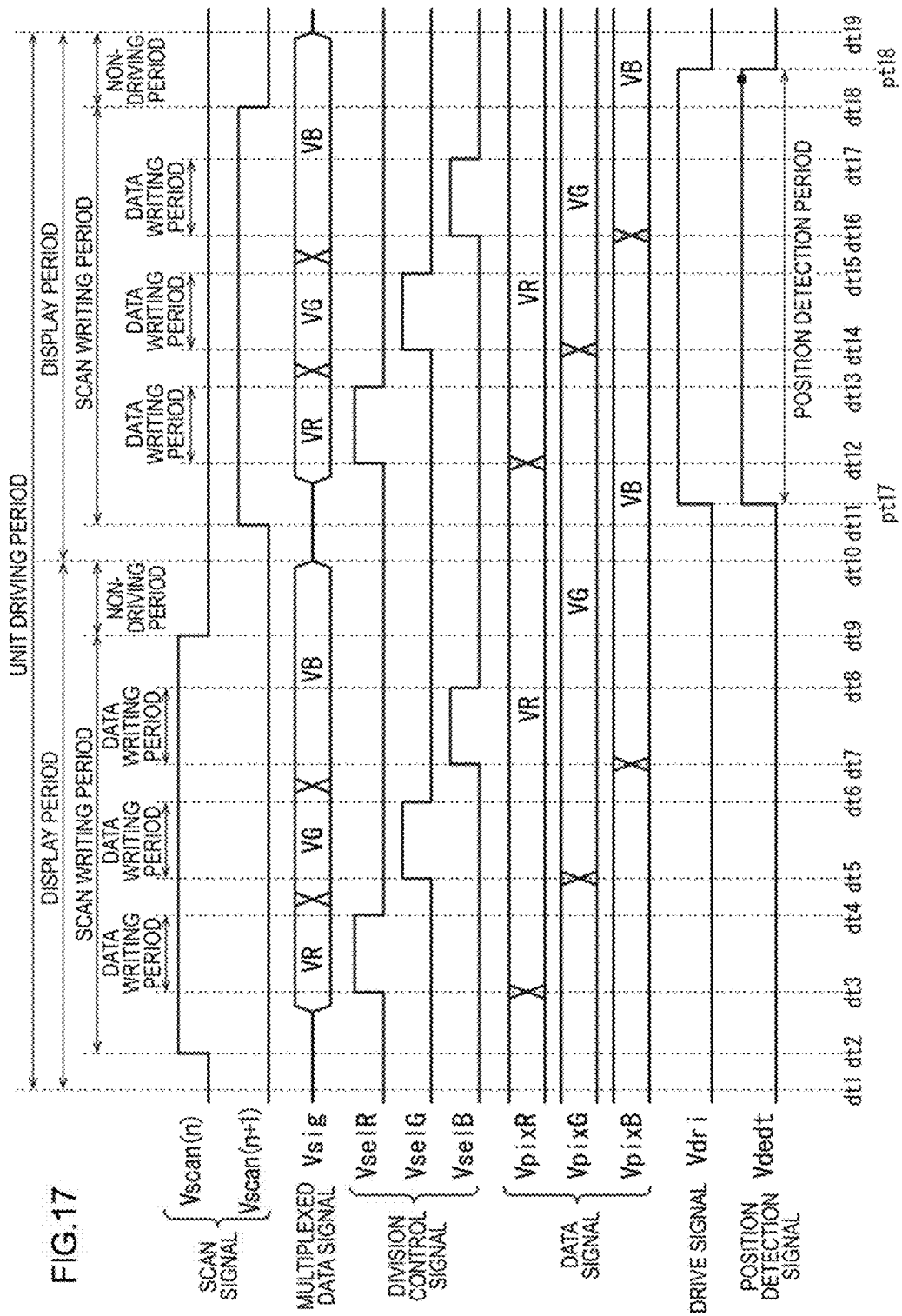
FIG. 17 is a timing chart illustrating control of display and control of position detection in a liquid crystal display device according to a fourth embodiment of the present invention.

As illustrated in FIG. 17, a main controller according to this embodiment controls the touch controller to supply the driver signals Vdri to the drive electrodes in one scan writing period that is selected from two scan writing periods in the consecutive two display periods to drive the drive electrodes. Namely, one position detection period (timing pt17 to timing pt18) is present for one unit driving period and chronologically overlap one of the scan writing periods but does not overlap the other one of the scan writing periods. As the definition of the liquid crystal display device increases, the scan writing periods tend to decrease. As the screen size of the liquid crystal display device increases, time required for the position detection tends to increase. In such cases, it may be difficult to perform the position detection per scan writing period. In this embodiment, the position detection is selectively performed in the scan writing period in one of the two consecutive display periods. Therefore, even if the scan writing periods decrease as the definition increases or the period required for the position detection increases as the screen size increases, the position detection can be properly performed. This configuration is preferable for increasing the definition and the screen size.

More specifically, the touch controller that is controlled by the main controller controls the position detection such that timing pt17 at which the position detection period starts is between timing dt11 at which the scan writing period included in the second display period and timing dt12 at which the red data writing period starts. Furthermore, the touch controller controls the position detection such that timing pt18 at which the position detection period ends is between timing dt18 at which the non-driving period starts and timing dt19 at which the non-driving period ends. Namely, the position detection period extends through three data writing periods in the second display period. Then, the touch controller detects the position detection signals Vdet that are output by the detection electrodes in the non-driving period of the position detection period after the scan writing period, that is, the scan non-writing period in which the scan signals Vscan are not written (timing dt18 to timing dt19).

As described above, according to this embodiment, the TFTs are arranged in the grid along the plate surface of the array board and the row control circuit in the display driver portion supplies the scan signals Vscan in sequence to the TFTs arranged in the grid by scanning along the row direction to drive the TFTs. The touch controller supplies the drive signals Vdri to the drive electrodes in one scan writing period selected from multiple consecutive scan writing periods to drive the drive electrodes. According to the configuration, even if the scan writing periods decrease as the definition increases and a period required for the position detection increases as the screen size increases, a sufficient period is assured for the position detection. This configuration is preferable for increasing the definition and the screen size.

<Fifth Embodiment>

A fifth embodiment will be described with reference to FIG. 18. The fifth embodiment includes timing of position detection periods different from that of the fourth embodiment. Configurations, functions, and effects similar to those of the fourth embodiment will not be described.

Figure 18:
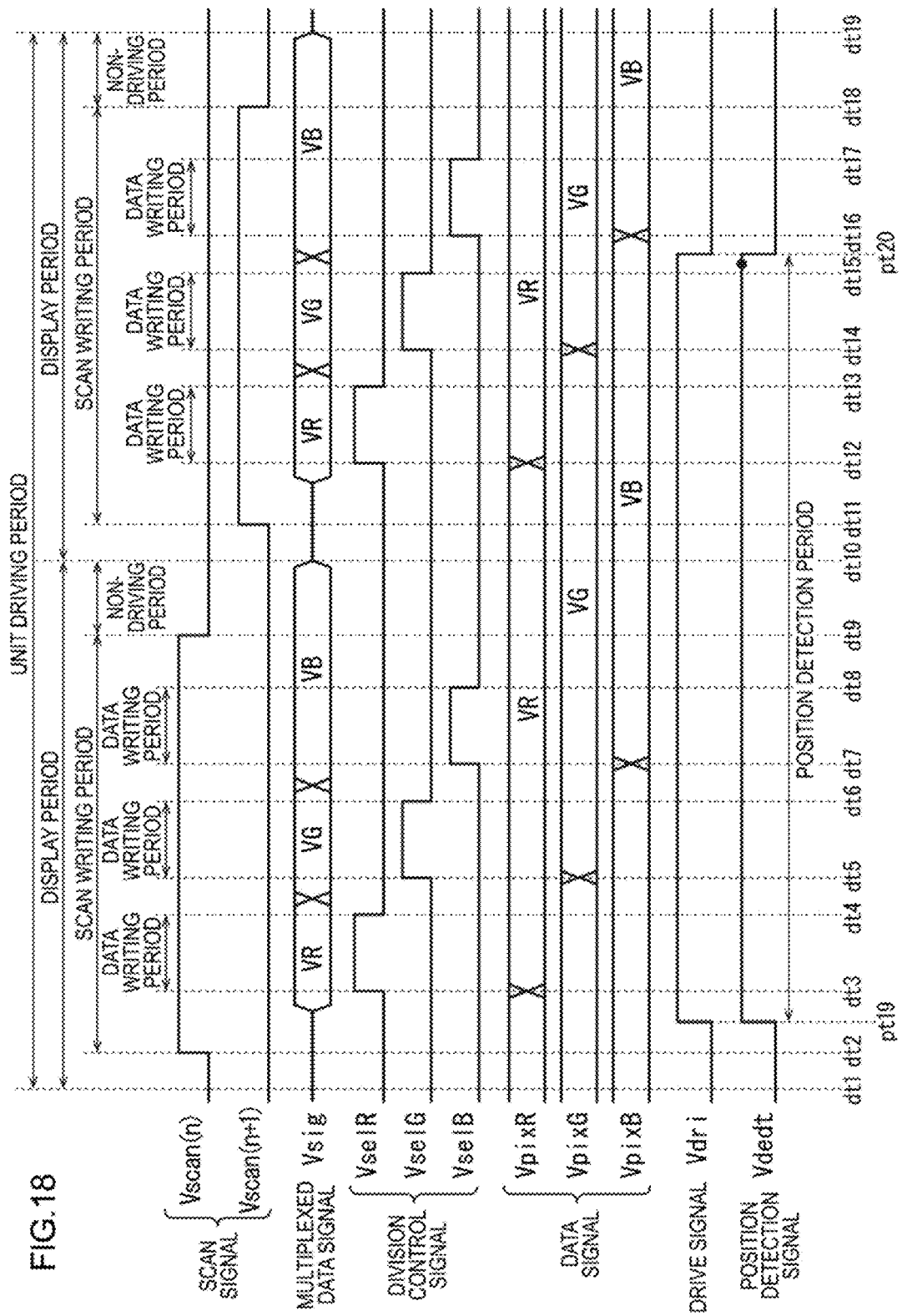
FIG. 18 is a timing chart illustrating control of display and control of position detection in a liquid crystal display device according to a fifth embodiment of the present invention.

As illustrated in FIG. 18, a main controller according to this embodiment controls a touch controller to supply drive signals Vdri to the drive electrodes across two scan writing periods that are included in two consecutive display periods. Namely, one position detection period (timing pt19 to timing pt20) is present in one unit driving period and to chronologically overlap two scan writing periods. The scan writing period tends to decrease as the definition of the liquid crystal display device increases and the period required for the position detection tends to increase as the screen size of the liquid crystal display device increases. In such cases, it may be difficult to perform the position detection per the scan writing period. In this embodiment, the position detection is performed across two scan writing periods included in two consecutive display periods. Therefore, even if the scan writing period decreases as the definition increases and the the period required for the position detection increases as the screen size increases, the position detection can be properly performed. This configuration is preferable for increasing the definition and the screen size.

Specifically, the touch controller that is controlled by the main controller controls the position detection such that timing pt19 at which the position detection period starts is between timing dt2 at which the scan writing period included in the first display period and timing dt3 at which the red data writing period starts. Furthermore, the touch controller controls the position detection such that timing pt20 at which the position detection period ends is between timing dt15 at which the green data writing period included in the second display period ends and timing dt16 at which the blue data writing period starts. Namely, the position detection period is across the scan writing period (including three data writing periods) and the non-driving period included in the first display period and the scan writing period (including two data writing periods) included in the second display period. The touch controller detects the position detection signals Vdet that are output by the detection electrodes in the data non-writing periods of the position detection period (timing dt15 to timing dt16) in which the data signals VpixR, VpixG, and VpixB are not written after the data writing periods.

As described above, according to this embodiment, the TFTs are arranged in the grid along the plate surface of the array board and the row control circuit in the display driver portion supplies the scan signals Vscan in sequence to the TFTs arranged in the grid by scanning along the row direction to drive the TFTs. The touch controller supplies the drive signals Vdri to the drive electrodes across multiple consecutive scan writing periods to drive the drive electrodes. According to the configuration, even if the scan writing periods decrease as the definition increases and a period required for the position detection increases as the screen size increases, a sufficient period is assured for the position detection. This configuration is preferable for increasing the definition and the screen size.

<Sixth Embodiment>

A sixth embodiment will be described with reference to FIG. 19. The sixth embodiment includes a liquid crystal panel 511 having a configuration different from that of the first embodiment. Configurations, functions, and effects similar to those of the first embodiment will not be described.

Figure 19:
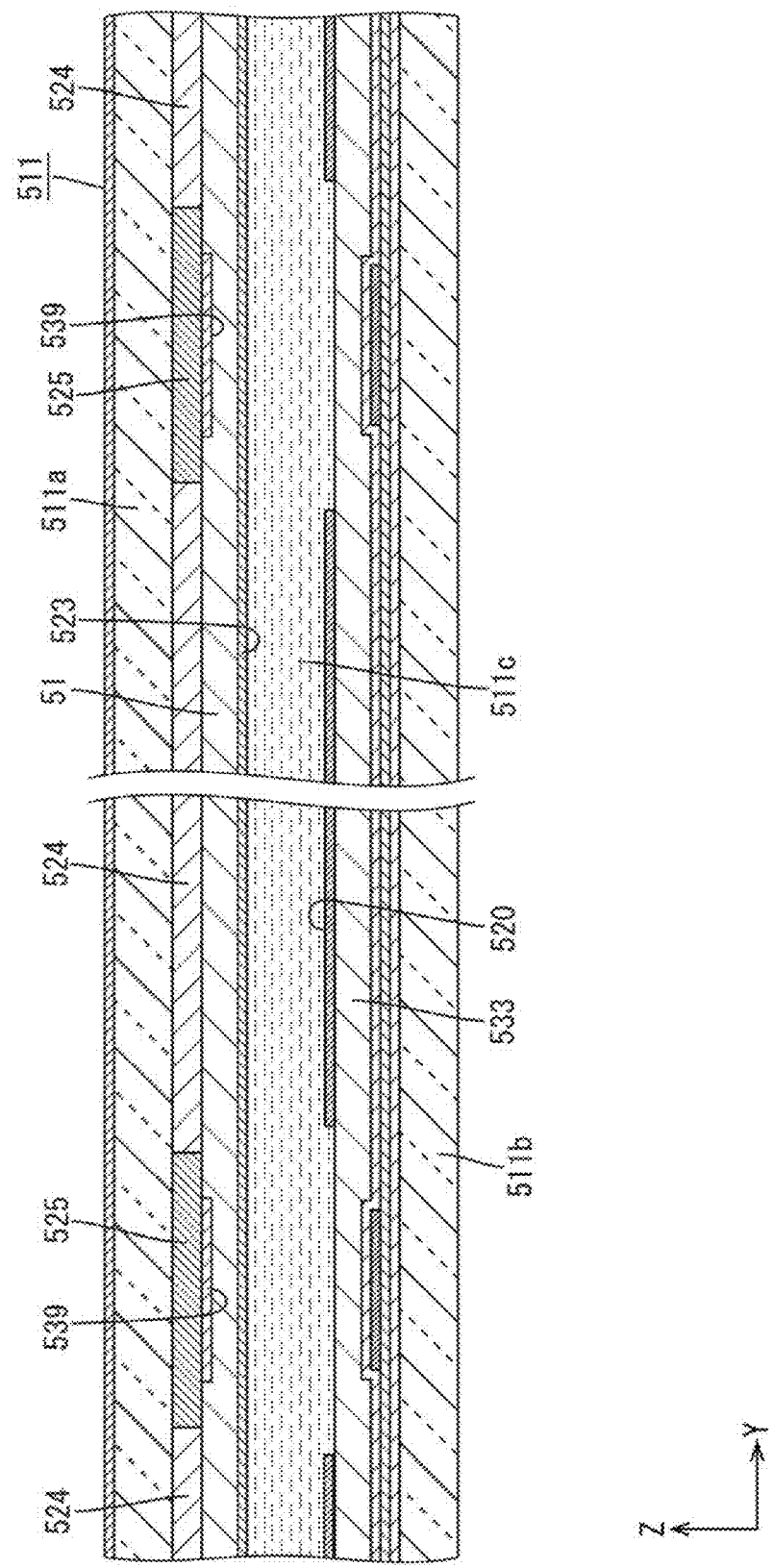
FIG. 19 is a timing chart illustrating control of display and control of position detection in a liquid crystal display device according to a sixth embodiment of the present invention.

As illustrated in FIG. 19, the liquid crystal panel 511a ccording to this embodiment includes an array board 511b and a CF board 511a that includes common electrodes 523 rather than the array board 511b. Namely, the liquid crystal panel 511 operates in vertical alignment mode in which liquid crystal molecules included in a liquid crystal layer 511c are vertically oriented. Specifically, the CF board 511a includes color filters 524, a light blocking portion 525, and a planarization film 51. The planarization film 51 is formed over drive electrodes 539 on the liquid crystal layer 511c side. The common electrodes 523 are formed over the planarization film 51 on the liquid crystal layer 511c side. With the planarization film 51, the drive electrodes 539 and the common electrodes 523 both formed on the inner surface side of the CF board 511a are insulated from each other. The common electrodes 523 are formed in a solid pattern in about entire area of the plate surface of the CF board 511a. Pixel electrodes 520 included in the array board 511b do not include the slits 20a (see FIG. 8) in areas in which the pixel electrodes are formed unlike the first embodiment. The pixel electrodes 520 are formed on a planarization film 533.

<Other Embodiments>

The present invention is not limited to the embodiments, which have been described using the foregoing descriptions and the drawings. The following embodiments may be included in the technical scope of the present invention.

(1) A modification of the first embodiment may include the position detection periods across the red data writing periods and the green data writing periods. Other than that, the position detection periods may be across the red data writing periods, the green data writing periods, and the blue data writing periods.

(2) A modification of the first embodiment may include each position detection period may chronologically overlap one data writing period selected from three data writing periods.

(3) A modification of the second embodiment may include the position detection periods, each being across the non-driving periods and two data writing periods of green and blue or each being across the non-driving periods and the data writing periods of red, green, and blue.

(4) A modification of the second embodiment may include the position detection period that is present only in one of two consecutive display periods as in the fourth embodiment.

(5) A modification of the third embodiment may include three or more position detection periods that are present in one display period.

(6) A modification of the third embodiment may include any one of two position detection periods that are present in one display period across multiple data writing periods.

(7) A modification of the third embodiment may include any one of two position detection periods that are present in one display period across the data writing period and the non-driving period as in the second embodiment.

(8) A modification of the third embodiment may include multiple position detection periods that are present in any one of two consecutive display periods.

(9) A modification of the third embodiment may include the position detection period that is any one of the position detection periods that are present across two consecutive display periods.

(10) A modification of the fourth embodiment may include the position detection period that is present only in two consecutive display periods.

(11) A modification of the fifth embodiment may include the position detection period across the non-driving period included in the first display period of two consecutive display periods and one or multiple data writing periods that are included in the second display period, that is, the positon detection period is not present in the data writing period in the first display period. The position detection period may be across the non-driving period that is included in the first display period of two consecutive display periods or the data writing period and the non-driving period and three data writing periods and the non-driving period included in the second display period. The position detection period may be across the non-driving period included in the first display period of two consecutive display periods or the data writing period and the non-driving period and one or three data writing periods included in the second display period. The position detection period may be across one or two data writing periods and the non-driving period included in the first display period of two consecutive display periods and one, two, or three data writing periods or three data writing periods and the non-driving period included in the second display period.

(12) A modification of the sixth embodiment may include color filters that cover the light blocking portion and the drive electrodes. In this case, the drive electrodes are insulated from the common electrodes with the color filters and thus the planarization film of the CF board is not required.

(13) In each of the above embodiments, detection of the position detection signals that are output by the detection electrodes is performed once in the position detection period are detected (touch sensing). However, the detection of the position detection signals that are output by the detection electrodes may be performed multiple times in the position detection period.

(14) In each of the above embodiments, each multiplex data signal is separated into multiple data signals by the column control circuit and the data signals are supplied to the respective source lines. However, the column control circuit may be omitted and multiple data signals may be directly supplied from the driver to the source signals, respectively. This configuration is preferable for the semiconductor film of the TFTs formed from amorphous silicon or oxide semiconductor.

(15) In each of the above embodiments, the scan signals are supplied to the gate lines by the row control circuit. However, the row control circuit may be omitted and a gate driver may be mounted on the array board to supply the scan signals from the gate driver to the gate lines, respectively. Alternatively, the gate driver may be omitted and the scan signals may be supplied from the driver to the respective gate lines. These configurations are preferable for the semiconductor film of the TFTs formed from amorphous silicon or oxide semiconductor.

(16) In each of the above embodiments, the array board includes the planarization film. However, the planarization film of the array board may be omitted.

(17) In each of the above embodiments, the display driving includes the display periods that include the non-driving periods. However, the present invention may be applied to display driving that includes display periods that do not include non-driving periods.

(18) In each of the above embodiments, the liquid crystal display device includes the liquid crystal panel that operates in FFS mode or the liquid crystal panel that operates in VA mode. However, the present invention may be applied to a liquid crystal display device including a liquid crystal panel that operates in in-plane switching (IPS) mode.

(19) The dummy lines or the monolithic circuit in each of the above embodiments may be omitted.

(20) In each of the above embodiments, the touch area of the touchscreen pattern and the display area of the liquid crystal panel correspond to each other. However, they may not completely correspond to each other. For example, the touch area of the touchscreen pattern may correspond to an entire area of the display area of the liquid crystal panel and a portion of the non-display area (a portion closer to the display area).

(21) The semiconductor film of each of the above embodiments is the CG silicon thin film (a polysilicon thin film). However, oxide semiconductor or amorphous silicon may be used for the material of the semiconductor film.

(22) In each of the above embodiments, the color filters of the liquid crystal panel are in three colors of red, green, and blue. However, the present invention may be applied to color filters including four color portions of red, green, blue, and yellow.

(23) Each of the above embodiments is the transmissive liquid crystal display device including the backlight unit, which is an external light source. However, the present invention may be applied to a reflective-type liquid crystal display device configured to display an image using ambient light. In this case, the backlight unit can be omitted. The present invention may be applied to a semitransmissive-type liquid crystal display device.

(24) Each of the above embodiments includes the liquid crystal panel categorized into the small size or the small-to-medium size liquid crystal panel used for various electronic devices including portable information terminals, mobile phones (including smartphones), notebook personal computers (including tablet personal computers), digital photo frames, and portable video game players. However, the present invention may be applied to medium-size or large-size (or supersize) liquid crystal panels having screen sizes in a range from 20 inches to 90 inches. Such liquid crystal panels may be used for electronic devices including television devices, digital signage, and electronic blackboards.

(25) Each of the above embodiments includes the liquid crystal panel including the liquid crystal layer sandwiched between the substrates. However, the present invention may be applied to a display panel including functional organic molecules other than the liquid crystals between substrates.

(26) Each of the above embodiments includes the TFTs as the switching components of the liquid crystal panel. The present invention can be applied to a liquid crystal display device including a liquid crystal panel including switching components other than the TFTs (e.g., thin film diodes (TFD)). The present invention can be applied to a liquid crystal display device including a liquid crystal panel for black-and-white display other than the liquid crystal display device including the liquid crystal panel for color display.

(27) Each of the above embodiments is the liquid crystal display device including the liquid crystal panel as the display panel. However, the present invention can be applied to display device including other types of display panels (plasma display panel (PDP), organic EL panels, electrophoretic panels (EPDs)). The backlight unit can be omitted.

EXPLANATION OF SYMBOLS

10: liquid crystal display device (display device including position inputting function), 11*a*, 511*a*: CF board (common board), 11*b*, 511*b*: array board, 16: driver (display driver), 19: TFT (display component), 20, 520: pixel electrode, 23, 523: common electrode, 37*a*: column control circuit (division controller), 37*b*: row control circuit (display driver portion), 38: detection electrode, 39, 538: drive electrode, 48: touch controller (position detection controller), 49: main controller (display driver portion, position detection controller), Vscan: scan signal, Vdet: position detection signal, Vdri: drive signal, Vsel: division control signal, Vsig: multiplexed data signal, Vpix: data signal

The invention claimed is:
1. A display device with a position inputting function comprising:
  display components;
  pixel electrodes connected to the display components;
  common electrodes forming capacitance with the pixel electrodes;
  an array board on which at least the display components are disposed;
  a common board opposed to the array board with a gap therebetween;
  detection electrodes on the common board, the detection electrodes extending in a direction along a plate surface of the common board;
  drive electrodes on the common board, the drive electrodes extending in a direction along the plate surface of the common board and perpendicular to the direction in which the detection electrodes extend and overlapping the detection electrodes in a plan view, the drive electrodes forming capacitance with the detection electrodes that overlap the drive electrodes;
  a display driver portion for supplying scan signals and data signals to the display components for display driving, wherein the display drive portion is further configured to perform the display driving such that a display period includes a scan writing period and a non-driving period in which driving of the display components is halted; and
  a position detection controller for supplying drive signals to the drive electrodes and detecting position detection signals that are output by the detection electrodes to perform position detection control, the position detection controller being configured to supply the drive signals to the drive electrodes in the scan writing period in which the scan signals are supplied to the display components by the display driver portion to drive the display components, wherein the position detection controller is further configured to supply the drive signals to the drive electrodes across the scan writing period and the non-driving period to drive the drive electrodes and to detect the position detection signals that are output by the detection electrodes in the non-driving period.

2. The display device with a position inputting function according to claim 1, wherein
  the display driver portion is configured to output a multiplexed data signal including multiple data signals that are multiplexed and a division control signal for dividing the multiplexed data signal into the multiple data signals,
  the display device further comprising a division controller configured to receive the multiplexed data signal and the division control signal that are output by the display driver portion and to separate the multiple data signals from the multiplexed data signal based on the division control signal to supply the data signals to the display components with time division, and
  the position detection controller is configured to supply the drive signals to the drive electrodes across multiple data writing periods in which the multiple data signals separated by the division controller with the time division and supplied to the multiple display components to drive the drive electrodes and to detect the position detection signals that are output by the detection electrodes at timing at which the data writing periods end.

3. The display device with a position inputting function according to claim 1, wherein the position detection controller is configured to supply the drive signals to the drive electrodes multiple times in the scan writing period.

4. The display device with a position inputting function according to claim 1, wherein
  the display components are arranged in a matrix along the plate surface of the array board,
  the display driver portion is configured to supply the scan signals to scan the display components arranged in the matrix in sequence along a row direction to drive the display components, and
  the position detection controller is configured to supply the drive signals to the drive electrodes to drive the drive electrodes in scan writing periods present in sequence.

5. The display device with a position inputting function according to claim 1, wherein
  the display components are arranged in a matrix along the plate surface of the array board,
  the display driver portion is configured to supply the scan signals to scan the display components arranged in the matrix in sequence along a row direction to drive the display components, and
  the position detection controller is configured to supply the drive signals to the drive electrodes to drive the drive electrodes in one scan writing period selected from consecutive multiple scan writing periods.

6. The display device with a position inputting function according to claim 1, wherein
the display components are arranged in a matrix along the plate surface of the array board,
the display driver portion is configured to supply the scan signals to scan the display components arranged in the matrix in sequence along a row direction to drive the display components, and
the position detection controller is configured to supply the drive signals to the drive electrodes to drive the drive electrodes across consecutive multiple scan writing periods.

7. The display device with a position inputting function according to claim 1, wherein
the pixel electrodes and the common electrodes are disposed on a plate surface of the array board on a common board side,
the detection electrodes are disposed on one of plate surfaces of the common board, and
the drive electrodes are disposed on another one of the plate surfaces of the common board.

\* \* \* \* \*